United States Patent
Nakayama et al.

(10) Patent No.: US 8,154,685 B2
(45) Date of Patent: Apr. 10, 2012

(54) PLANAR ILLUMINATION DEVICE, AND IMAGE DISPLAY DEVICE

(75) Inventors: Kenji Nakayama, Osaka (JP); Shinichi Shikii, Nara (JP); Kazuhisa Yamamoto, Osaka (JP); Takayuki Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 12/519,947

(22) PCT Filed: Oct. 22, 2008

(86) PCT No.: PCT/JP2008/002984
§ 371 (c)(1),
(2), (4) Date: Jun. 18, 2009

(87) PCT Pub. No.: WO2009/054124
PCT Pub. Date: Apr. 30, 2009

(65) Prior Publication Data
US 2010/0039585 A1 Feb. 18, 2010

(30) Foreign Application Priority Data
Oct. 25, 2007 (JP) ................................. 2007-277319

(51) Int. Cl.
*G02F 1/1335* (2006.01)
*G09F 13/04* (2006.01)

(52) U.S. Cl. ............. 349/64; 349/61; 349/62; 362/97.1; 362/97.2

(58) Field of Classification Search ............ 349/64, 349/61, 62; 362/97, 97.21, 97.1, 97.2
See application file for complete search history.

(56) References Cited

U.S. PATENT DOCUMENTS

| 7,661,862 B2 * | 2/2010 | Lee et al. ............... 362/559 |
| 7,859,610 B2 * | 12/2010 | Mizushima et al. ........... 349/61 |
| 2010/0053497 A1 * | 3/2010 | Nagata et al. ................. 349/61 |

FOREIGN PATENT DOCUMENTS

| JP | 2002-184225 | 6/2002 |
| JP | 2005-157025 | 6/2005 |
| JP | 2007-25652 | 2/2007 |
| WO | 2007/074787 | 7/2007 |

OTHER PUBLICATIONS

International Search Report issued Nov. 18, 2008 in the International (PCT) Application No. PCT/JP2008/002984.

* cited by examiner

*Primary Examiner* — Mike Qi
(74) *Attorney, Agent, or Firm* — Wenderoth, Lind & Ponack, L.L.P.

(57) ABSTRACT

A laser light source (1) emits a beam. A collimator lens (2) converts the beam emitted from the laser light source (1) into first substantially parallel light. A lenticular lens (3) expands a beam of the first substantially parallel light converted by the collimator lens (2) into a linear shape in a first direction. A Fresnel lens (4) converts the beam expanded in the first direction by the lenticular lens (3) into second substantially parallel light. A free curved surface mirror (5) has a reflecting surface formed into a free curved surface, and expands a beam of the second substantially parallel light converted by the Fresnel lens (4) into a planar shape in a second direction orthogonal to the first direction. This arrangement enables to provide a planar illumination device with a small thickness and high light use efficiency.

20 Claims, 25 Drawing Sheets

PLANAR ILLUMINATION DEVICE, AND IMAGE DISPLAY DEVICE

TECHNICAL FIELD

The present invention relates to a planar illumination device utilizing a laser as a light source, and an image display device incorporated with the planar illumination device as a backlight device.

BACKGROUND ART

Image display devices are roughly classified into light emitting displays such as a CRT (Cathode Ray Tube) or a PDP (Plasma Display Panel), and non-light emitting displays for displaying an image by changing the light transmittance, such as an LCD (Liquid Crystal Display) incorporated with a liquid crystal panel. Generally, the non-light emitting display is incorporated with a planar illumination device serving as a backlight device on a rear surface thereof, and is operable to display an image by changing the transmitted amount of illumination light to be emitted from the planar illumination device at each pixel. Accordingly, in the non-light emitting display, the planar illumination device greatly affects the electric power consumption, the image quality, the size, and the like of the image display device.

In recent years, an LCD incorporated with LEDs (light emitting diodes) as a backlight device has been developed. Use of LEDs is advantageous in realizing an LCD having high electricity-light conversion efficiency and high color purity, as compared with a conventional cathode ray tube system. Also, it is conceived that use of a laser light source as a backlight device is advantageous in producing an image display device with high electricity-light conversion efficiency and high color purity, as compared with an LED. This is because a laser has high electricity-light conversion efficiency and superior color reproducibility due to a small spectral bandwidth, as compared with an LED.

In an LCD, a liquid crystal panel is operable to change the amount of light transmitted through each pixel by controlling a polarized state of illumination light to be emitted from a planar illumination device. Accordingly, generally, in the LCD, polarized light of illumination light is aligned in one direction while transmitting through a polarization filter or a like device, and light whose polarization is aligned in one direction i.e. linearly polarized light is incident onto the liquid crystal panel.

On the other hand, laser light is generally linearly polarized light. Accordingly, using the laser light as illumination light of LCD enables to eliminate the need of using a polarization filter for LCD, thereby enhancing light use efficiency of LCD. Further, since a laser has a very fast time response, as compared with a cathode ray tube, laser light can be modulated at a high speed. Accordingly, this arrangement is advantageous in eliminating use of a color filter, which has been conventionally used for dividing the colors for the pixels of a liquid crystal panel, and realizing a color field sequential system of turning on light by time-sharing a screen for multiple colors. In the case where the color field sequential system is employed, light loss of a color filter for LCD is eliminated. Accordingly, light use efficiency of LCD can be further enhanced.

Planar illumination devices incorporated with a laser light source are roughly classified into two types i.e. light guiding plate type of obtaining planar illumination light by allowing incidence of laser light through a side portion of a light guiding plate, and direct projection type of directly converting laser light into planar illumination light by using a mirror or a lens. Generally, in the light guiding plate type, laser light is incident through a side portion of a light guiding plate, the incident light is diffused in the interior of the light guiding plate, and the diffused light exits from the light guiding plate into a planar shape. A planar illumination device incorporated with a light guiding plate is proposed in e.g. patent literature 1.

On the other hand, in the direct projection type such as a projector, light is projected into a planar shape. In the direct projection type, since basically, light propagates in the air, a planar illumination device with less light transmission loss and high light use efficiency can be produced, as compared with the light guiding plate type constructed to guide light in the interior of the light guiding plate. An example of an image display device using an optical system of the direct projection type is a rear projection image display device.

In recent years, development of thin image display devices including LCDs has been progressed. In the case where the thickness of LCD is reduced, reducing the thickness of a planar illumination device as a backlight device is essential. There is also a demand for a planar illumination device as a backlight device with high light use efficiency in order to suppress the electric power consumption of LCD.

In a planar illumination device of the direct projection type, since a primary part of an optical path of light is constituted of the air, light loss in the optical path is small, and high light use efficiency is secured. Also, generally, in the direct projection type, there is no need of using an optical element which may cause a variation in polarization, such as a light guiding plate having a light diffusing function. Accordingly, the direct projection type is advantageous in obtaining linearly polarized planar illumination light.

A general optical system of a rear projection image display device for directly projecting an image onto a screen is described as an example of a direct projection image display device. FIG. 26 is a cross-sectional view showing a schematic arrangement of a general rear projection image display device. Light to be emitted from an optical engine 100 is modulated by an image display element 101, and the modulated light is expanded by a projection optical system 102. After the expanded light is reflected on a rear mirror 103, the reflected light is projected onto a screen 104. In the conventional rear projection image display device, since light transmitted through the projection optical system 102 is expanded into a rectangular shape, the overall size of the image display device may be increased.

Patent literature: JP-A 2002-184225

DISCLOSURE OF THE INVENTION

In view of the above, it is an object of the present invention to provide a planar illumination device and an image display device having a reduced thickness and a high light use efficiency.

A planar illumination device according to an aspect of the invention includes: a laser light source; a first converting portion for converting a beam to be emitted from the laser light source into first substantially parallel light; a one-dimensional light diffuser for expanding a beam of the first substantially parallel light converted by the first converting portion into a linear shape in a first direction; a second converting portion for converting the beam expanded in the first direction by the one-dimensional light diffuser into second substantially parallel light; and a free curved surface mirror having a reflecting surface formed into a free curved surface, and for expanding a beam of the second substantially parallel light converted by the second converting portion into a planar shape in a second direction orthogonal to the first direction.

In the above arrangement, the first converting portion converts the beam to be emitted from the laser light source into the first substantially parallel light. The one-dimensional light diffuser expands the beam of the first substantially parallel light into the linear shape in the first direction. The second converting portion converts the beam expanded in the first direction into the second substantially parallel light. Then, the free curved surface mirror having the reflecting surface formed into the free curved surface expands the beam of the second substantially parallel light into the planar shape in the second direction orthogonal to the first direction.

According to the present invention, the length of the beam expanded into the linear shape in the first direction is fixed in the second direction. Accordingly, even if the beam of the linear shape is extended in the first direction, the length of the beam in the second direction is unchanged. This enables to produce a planar illumination device with a reduced thickness. Also, the beam is expanded into the planar shape while being reflected on the free curved surface mirror, and the beam does not transmit through an optical element. This enables to produce a planar illumination device with less light transmittance loss and high light use efficiency.

These and other objects, features and advantages of the present invention will become more apparent upon reading the following detailed description along with the accompanying drawings.

BEST MODE FOR CARRYING OUT THE INVENTION

Figure 1:
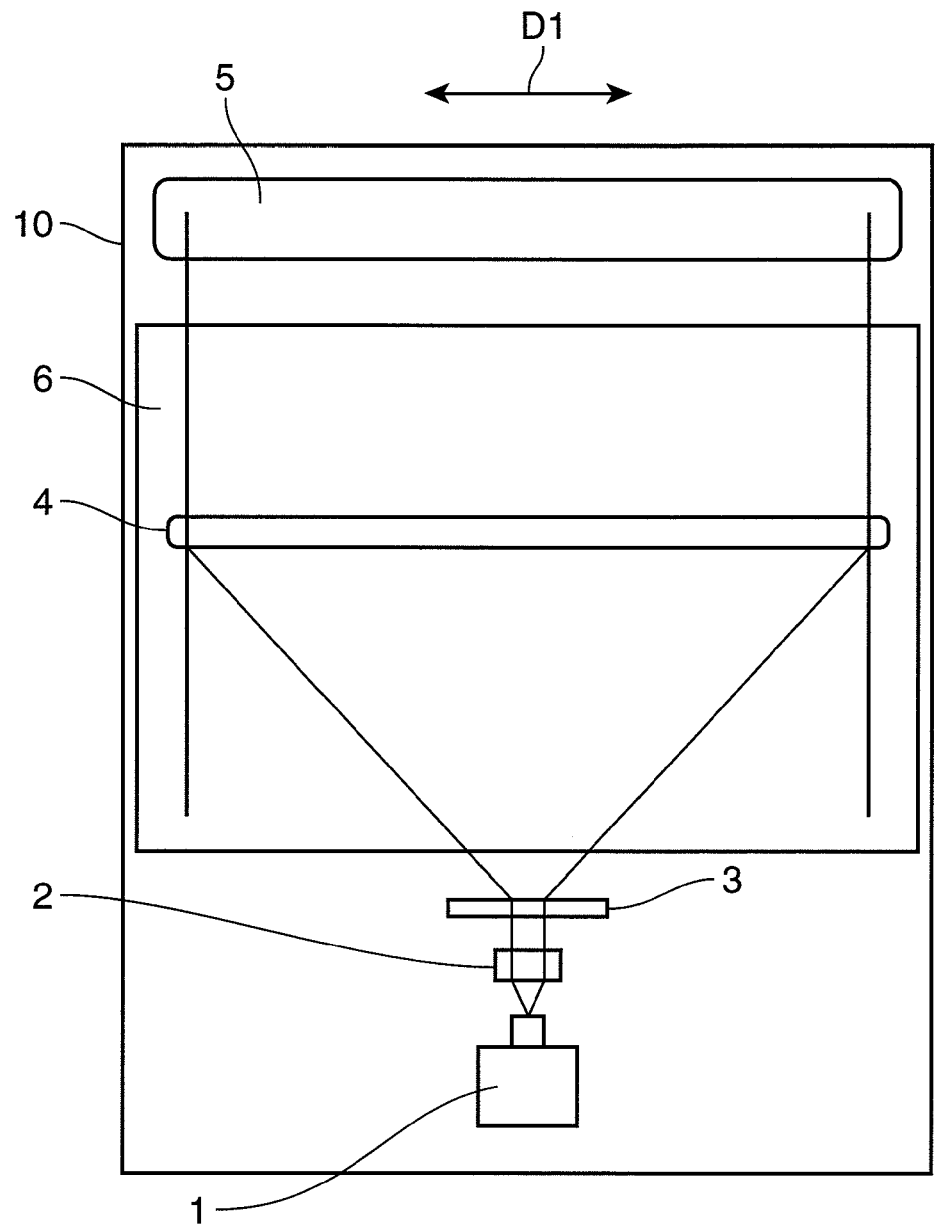
FIG. 1 is a front view showing a schematic arrangement of a planar illumination device in accordance with the first embodiment of the invention.

In the following, embodiments of the invention are described referring to the drawings. The following embodiments are merely examples embodying the invention, and do not limit the technical scope of the invention.

First Embodiment

In this section, a schematic arrangement of a planar illumination device in accordance with the first embodiment of the invention is described.

Figure 2:
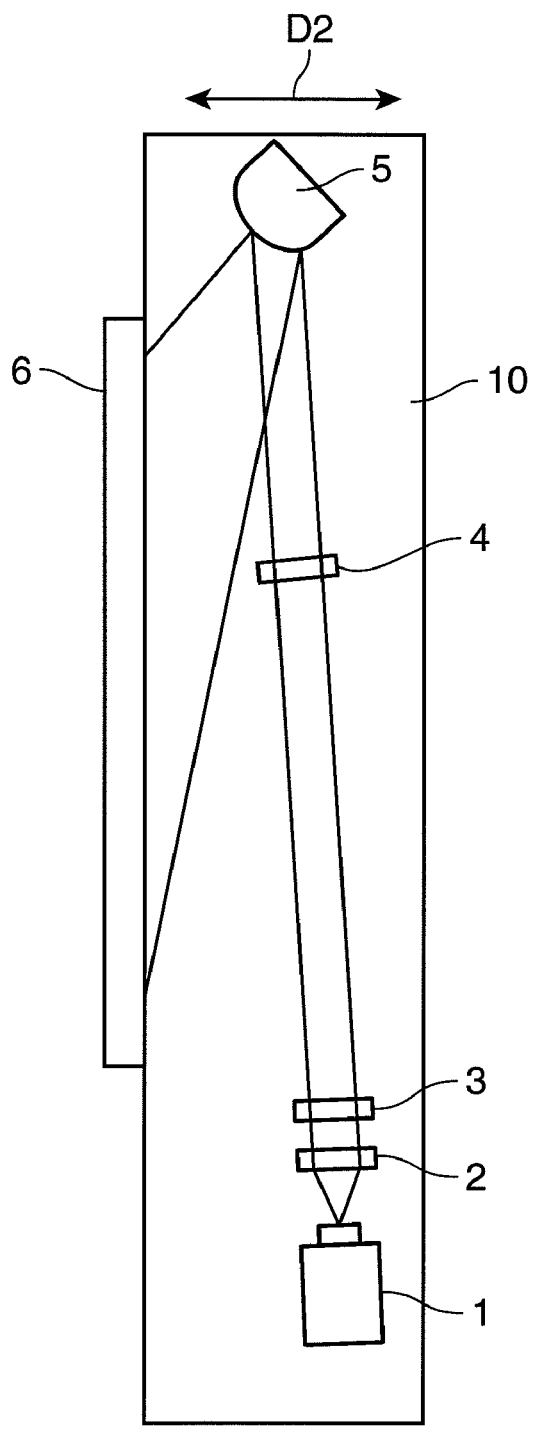
FIG. 2 is a side view showing a schematic arrangement of the planar illumination device in accordance with the first embodiment of the invention.

FIGS. 1 and 2 are diagrams showing a schematic arrangement of the planar illumination device in accordance with the first embodiment of the invention. FIG. 1 is a front view showing a schematic arrangement of the planar illumination device in accordance with the first embodiment of the invention, and FIG. 2 is a side view showing a schematic arrangement of the planar illumination device in accordance with the first embodiment of the invention.

The planar illumination device 10 in accordance with the first embodiment is adapted to irradiate laser light in a planar shape. The planar illumination device 10 includes a laser light source 1, a collimator lens 2, a lenticular lens 3, a Fresnel lens 4, a free curved surface mirror 5, and a light emitting portion 6.

The laser light source 1 is adapted to generate laser light. The collimator lens 2 is adapted to convert a beam emitted from the laser light source 1 into first substantially parallel light. The lenticular lens 3 is adapted to expand a beam of the first substantially parallel light converted by the collimator lens 2 into a linear shape in a first direction D1. The Fresnel lens 4 is adapted to convert the beam (hereinafter, also called as "line beam") expanded in the first direction D1 by the lenticular lens 3 into second substantially parallel light. The free curved surface mirror 5 has a reflecting surface formed into a free curved surface, and is adapted to reflect a beam of the second substantially parallel light converted by the Fresnel lens 4 into the planar shape in a second direction D2 orthogonal to the first direction D1. The light emitting portion 6 is adapted to emit the beam expanded into a planar shape to the exterior of the planar illumination device. Alternatively, a diffraction element for aligning light in an identical direction using light diffraction may be used, in place of the Fresnel lens 4.

In the first embodiment, the collimator lens 2 corresponds to an example of a first converting portion, the lenticular lens 3 corresponds to an example of a one-dimensional light diffuser, and the Fresnel lens 4 corresponds to an example of a second converting portion.

As described above, laser light emitted from the laser light source 1 is converted into the first substantially parallel light by the collimator lens 2. The collimator lens 2 may be arranged at any position. Preferably, however, the collimator lens 2 may be arranged near an exit end of the laser light source 1 to reduce the thickness of the planar illumination device 10. This is because the beam diameter of collimated light to be emitted from the collimator lens 2 can be reduced, considering that the closer the collimator lens 2 approaches the laser light source 1, the smaller the beam diameter of light to be incident onto the collimator lens 2 becomes.

The first substantially parallel light is transmitted through the lenticular lens 3, and is converted into a line beam expanded in the first direction D1. The first direction D1 is perpendicular to an optical axis of a beam to be emitted from the laser light source 1 and parallel to a light emission plane of planar illumination light. The line beam is expanded in the second direction D2 substantially in parallel.

The line beam is converted into the second substantially parallel light by the Fresnel lens 4 for incidence onto the free curved surface mirror 5. The second substantially parallel light is incident with an identical angle at any position on the reflecting surface of the free curved surface mirror 5. Incidence of the second substantially parallel light with an identical angle at any position on the reflecting surface of the free curved surface mirror 5 facilitates designing the reflecting surface of the free curved surface mirror 5. The free curved surface mirror 5 has a different shape depending on the intensity distribution of intended planar illumination light. For instance, in the case where uniform planar illumination light is required, the reflecting surface of the free curved surface mirror 5 has a curvature capable of making the intensity distribution of the second substantially parallel light in the first direction D1 uniform, and a curvature capable of making the intensity distribution of the line beam in the second direction D2 uniform while expanding the line beam.

In the case where uniform planar illumination light is obtained at a reduced processing cost of the free curved surface mirror 5, preferably, the intensity distribution of the second substantially parallel light in the first direction D1 is substantially uniform, and the free curved surface mirror 5 has a flat shape in section in the first direction D1. As far as the intensity distribution of the second substantially parallel light in the first direction D1 is uniform, the free curved surface mirror 5 may have a flat shape in section in the first direction D1 to obtain uniform planar illumination light. This is advantageous in reducing the processing cost of the free curved surface mirror 5.

As described above, since the free curved surface mirror 5 has a flat shape in section in the first direction D1, processability of the free curved surface mirror 5 is improved, thereby reducing the processing cost of the planar illumination device 10.

As described above, the second substantially parallel light is expanded substantially in parallel in the first direction D1. Accordingly, the length of the line beam to be incident onto the free curved surface mirror 5 is fixed without depending on the arrangement position of the free curved surface mirror 5. This enables to increase the degree of freedom concerning the arrangement position of the free curved surface mirror 5.

In the case where the Fresnel lens 4 is miniaturized, preferably, the Fresnel lens 4 may be disposed between the lenticular lens 3 and the free curved surface mirror 5. The line beam to be incident onto the Fresnel lens 4 is substantially in parallel to the second direction D2. Accordingly, disposing the Fresnel lens 4 between the lenticular lens 3 and the free curved surface mirror 5 enables to reduce the thickness of the incident plane of the Fresnel lens 4. Reducing the size of the Fresnel lens 4 results in reducing the thickness of the planar illumination device 10.

Further, the Fresnel lens 4 is arranged at an end of the rectangular light emitting portion 6 for emitting a beam expanded into a planar shape to the exterior of the planar illumination device 10, more specifically, near an upper end of the light emitting portion 6. Since the Fresnel lens 4 is arranged at the end of the rectangular light emitting portion 6 for emitting a beam expanded into a planar shape to the exterior of the planar illumination device 10, the planar illumination device 10 with a reduced thickness can be produced, without a likelihood that the Fresnel lens 4 may obstruct a beam reflected on the free curved surface mirror 5.

In order to reduce an intensity distribution variation of planar illumination light in the first direction D1 in the planar illumination device 10 in accordance with the first embodiment, preferably, the lenticular lens 3 may be used as a one-dimensional light diffuser.

Figure 3:
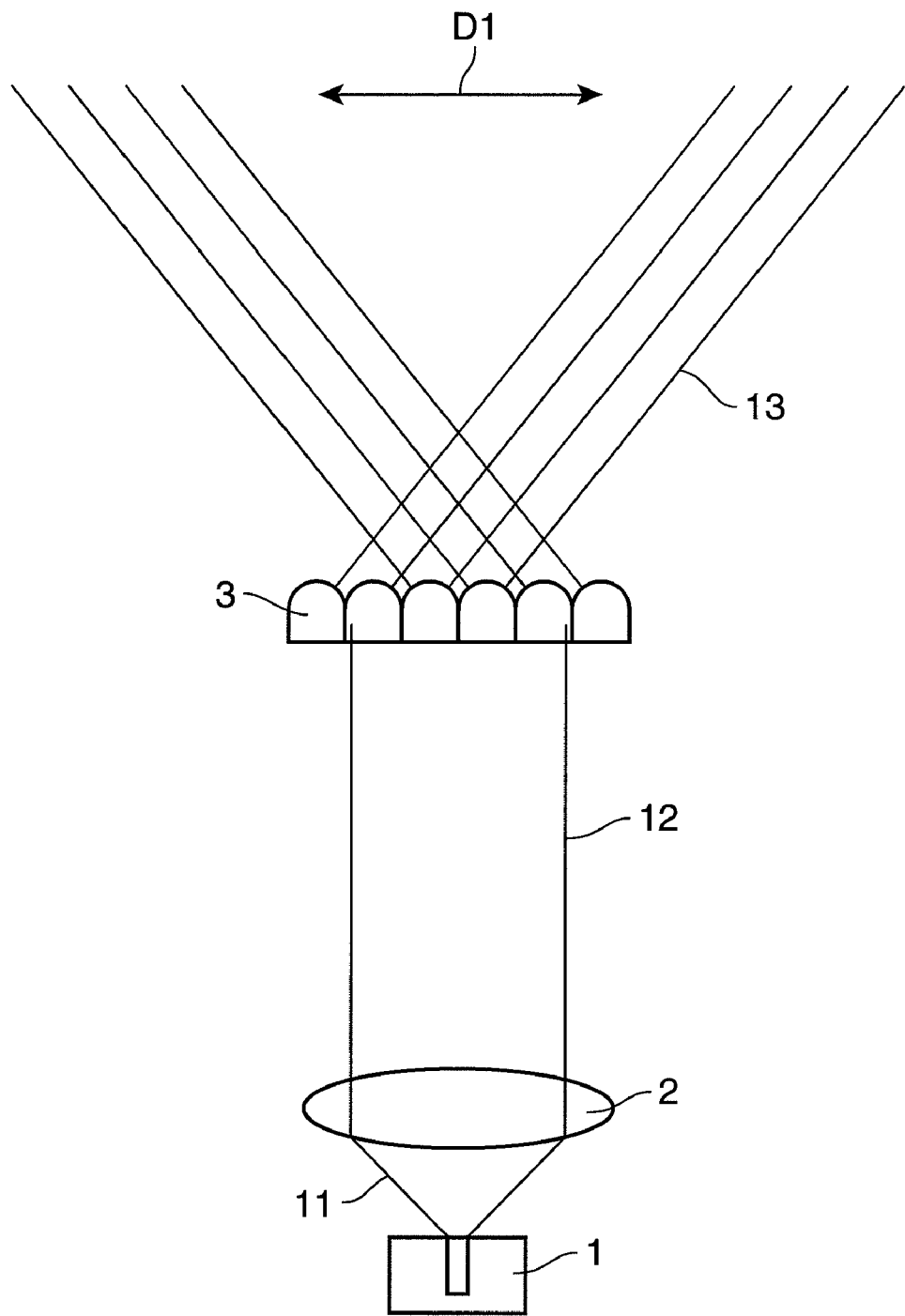
FIG. 3 is a diagram for describing a manner as to how a beam is expanded by a lenticular lens.

FIG. 3 is a diagram for describing a manner as to how a beam is expanded by a lenticular lens. Laser light 11 emitted from the laser light source 1 is converted into first substantially parallel light 12 by the collimator lens 2. The first substantially parallel light 12 is incident onto the lenticular lens 3, divided into multiple beams, and converted into a line beam 13 where the multiple beams are superimposed one over the other.

The lenticular lens 3 is an optical element constituted of a cylindrical lens array. Referring to FIG. 3, the lenticular lens 3 is indicated as a lens array constituted of six cylindrical lenses, wherein the four cylindrical lenses at the inner positions are operable to expand the first substantially parallel light 12 into the line beam 13. Each of the cylindrical lenses constituting the lenticular lens 3 is operable to expand and emit the first substantially parallel light 12 incident thereon. Thus, the first substantially parallel light 12 turns into the line beam 13 where beams are superimposed by the number of the cylindrical lenses for light incidence.

The intensity distribution of the line beam 13 composed of superimposed beams in the first direction D1 is substantially uniform without depending on the intensity distribution of the first substantially parallel light 12 in the first direction D1. This is because the line beam 13 is composed by superimposing beams of the first substantially parallel light 12, and the intensity distribution of the line beam 13 in the first direction D1 is obtained by averaging the intensity distributions of the beams to be incident onto the cylindrical lenses constituting the lenticular lens 3.

As described above, the lenticular lens 3 is operable to divide the first substantially parallel light into multiple beams, expand each of the multiple beams of the first substantially parallel light into a linear shape, and superimpose the multiple expanded beams of the first substantially parallel light one over the other.

With use of the lenticular lens 3, even if the intensity distribution of the first substantially parallel light 12 is changed resulting from a temperature change or aging deterioration, the intensity distribution of the line beam 13 to be incident onto the free curved surface mirror 5 in the first direction D1 can be made uniform. The intensity distribution of the line beam 13 to be incident onto the free curved surface mirror 5 in the first direction D1 affects the intensity distribution of the planar illumination device 10 in the first direction D1. In view of this, use of the lenticular lens 3 as a one-dimensional light diffuser enables to produce the high fidelity planar illumination device 10 with less change in the intensity distribution of planar illumination light in the first direction D1.

Use of the lenticular lens 3 is also advantageous in aligning the polarization direction of a beam to be incident onto the lenticular lens 3 with the polarization direction of a beam expanded into a linear shape by the lenticular lens 3.

Preferably, the lens pitch of the lenticular lens 3 is sufficiently smaller than the beam diameter. Use of the lens pitch equal to or smaller than one-fifth of the beam diameter enables to obtain planar illumination light having an intensity distribution variation of 20% or less in the first direction D1, with no or less influence of a change in the intensity distribution of the first substantially parallel light 12.

In converting the first substantially parallel light 12 into the line beam 13 by the lenticular lens 3, the number of beams to be divided and superimposed is determined by the number of cylindrical lenses through which the first substantially parallel light 12 is transmitted. Setting the number of cylindrical lenses through which the first substantially parallel light 12 is transmitted to five or more enables to form the line beam 13 with no or less dependence on the intensity distribution of the first substantially parallel light 12.

In the case where the polarization direction of the first substantially parallel light 12 is aligned with the polarization direction of the line beam 13 in transmitting the first substantially parallel light 12 through the lenticular lens 3, preferably, the lenticular lens 3 is made of a glass material or a resin having a small birefringence amount. With use of a resin having a smaller birefringence amount, a variation in the polarized component of a beam before and after transmittance through the lenticular lens 3 can be suppressed. For instance, a birefringence amount of 0.01 or less is preferable to set the polarization ratio of the line beam 13 to 100:1.

Figure 4:
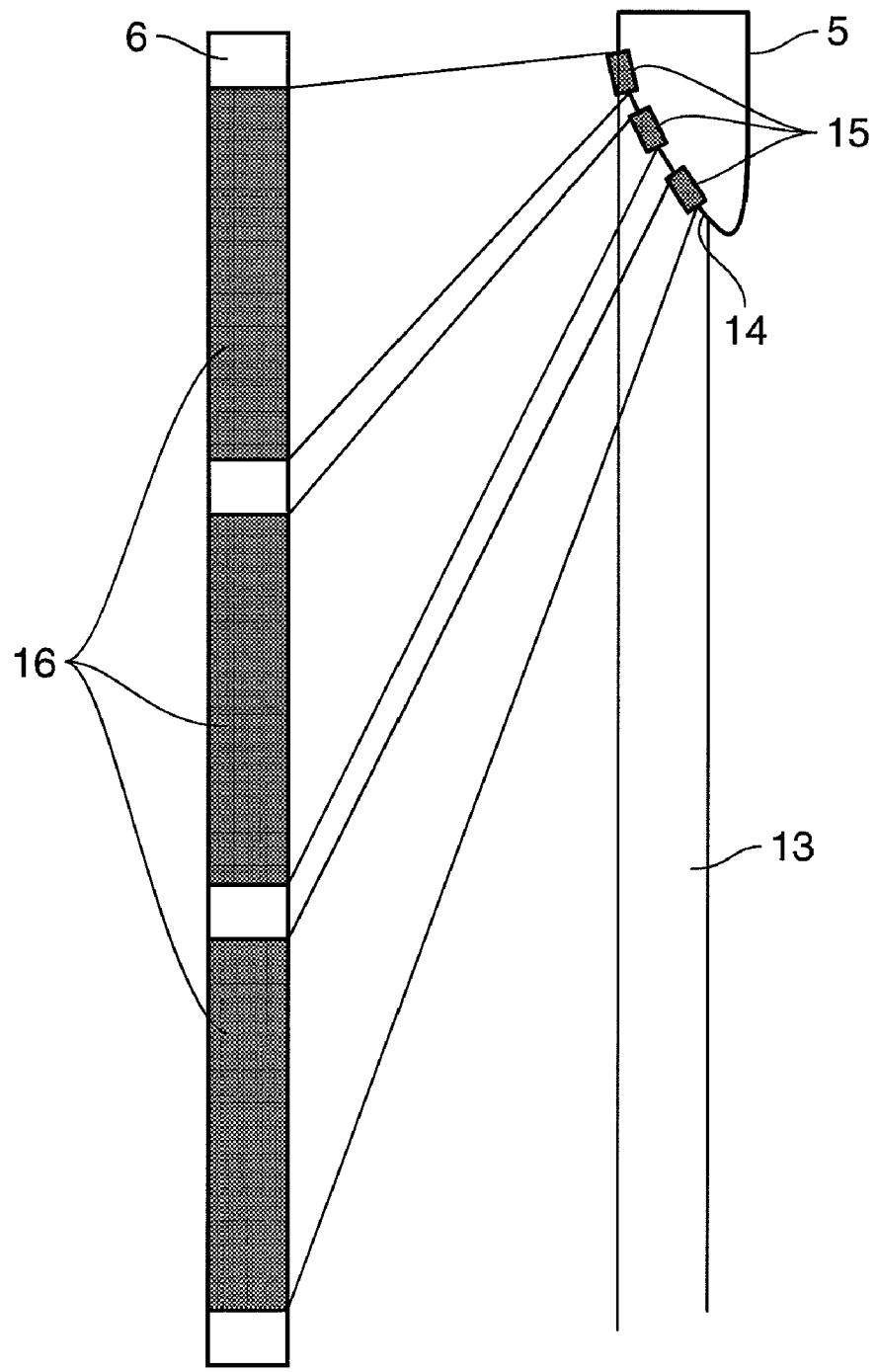
FIG. 4 is a sectional side view enlargedly showing a free curved surface mirror, a light emitting portion, and peripheral parts thereof in the planar illumination device.

Next, a method for designing a sectional shape of a light reflecting surface of the free curved surface mirror 5 in the planar illumination device 10 in accordance with the first embodiment is described. FIG. 4 is a sectional side view enlargedly showing the free curved surface mirror 5, the light emitting portion 6, and peripheral parts thereof in the planar illumination device. In FIG. 4, a cross section of the line beam 13, a cross section of the free curved surface mirror 5, and a cross section of the light emitting portion 6 are illustrated.

A light reflecting surface 14 of the free curved surface mirror 5 on which the line beam 13 is incident is formed on a lower left portion of the free curved surface mirror 5. The light reflecting surface 14 is divided into small segments 15. In FIG. 4, the light reflecting surface 14 is schematically divided into three small segments 15, and the light emitting portion 6 is schematically divided into three segments 16. Light incident on each of the small segments 15 is projected as the corresponding segment 16 having a certain length. The intensity distribution of the line beam 13 in the second direction D2 has e.g. a top-hat shape.

Figure 5:
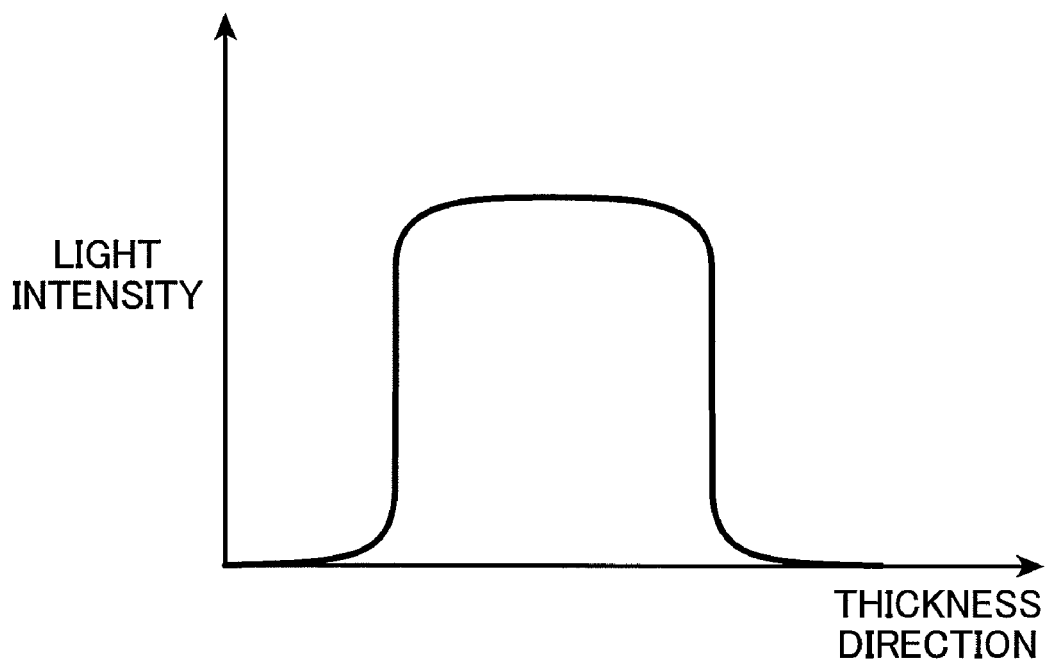
FIG. 5 is a diagram showing an example of a light intensity distribution of a planar illumination device in a thickness direction (second direction).

FIG. 5 is a diagram showing an example of an intensity distribution of a planar illumination device in a thickness direction (second direction). Referring to FIG. 5, the vertical axis indicates a light intensity, and the horizontal axis indicates a thickness direction. In the case where the line beam 13 has a top-hat shaped intensity distribution in the second direction D2, planar illumination light having a uniform intensity distribution can be obtained by setting the lengths of the segments 16 corresponding to projected light having an intended length in the planar illumination device 10, equal to each other. Planar illumination light having a uniform intensity distribution can be obtained by defining the light reflecting surface 14 of the free curved surface mirror 5, using a function indicating the projection.

Figure 6:
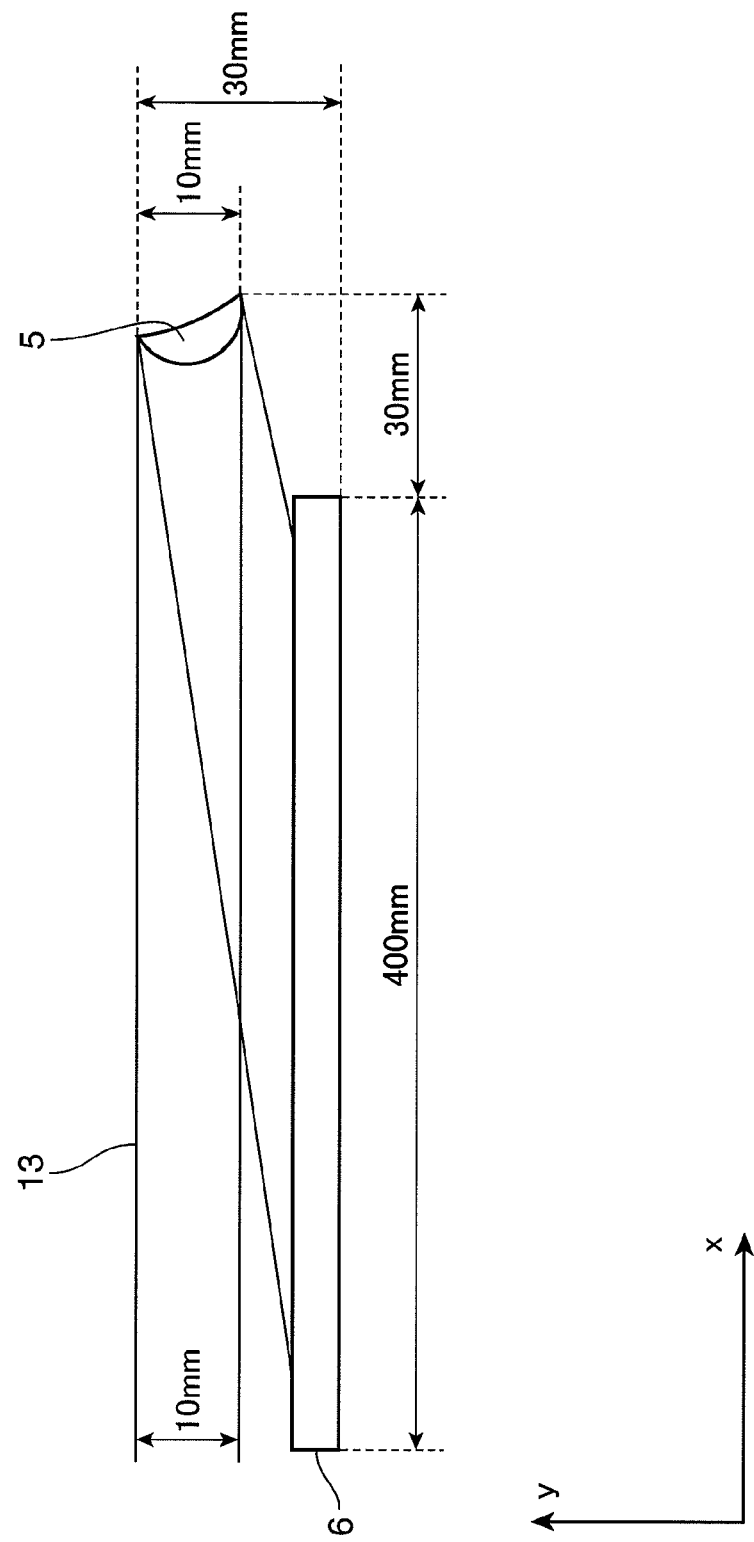
FIG. 6 is a diagram for describing a design example of a free curved surface mirror and a light emitting portion.

In the following, a design example of the free curved surface mirror 5 is described. For instance, the free curved surface mirror 5 and the light emitting portion 6 are designed under the following condition. FIG. 6 is a diagram for describing a design example of a free curved surface mirror and a light emitting portion. In the following condition, x direction indicates a propagating direction of laser light to be emitted from the laser light source 1, and y direction indicates a direction perpendicular to a light emission plane of the light emitting portion 6 i.e. the second direction.

(Condition)

intensity distribution of the line beam 13 in the second direction D2 (y direction):

top-hat shape thickness of the line beam 13 in y direction: 10 mm length of the free curved surface mirror 5 in y direction: 10 mm length of the light emission plane of the light emitting portion 6 in x direction: 400 mm position of the free curved surface mirror 5 in x direction (length from an end of the light emitting portion 6 on the side of the free curved surface mirror 5 to the free curved surface mirror 5 in x direction): 30 mm position of the free curved surface mirror 5 in y direction (length from the light emission plane of the light emitting portion 6 to the free curved surface mirror 5 in y direction): 30 mm In the above condition, the free curved surface mirror 5 is divided into (n) small segments 15 in y direction, and the light emission plane of the light emitting portion 6 is divided into (n) segments 16 in x direction, where n=400. By dividing the free curved surface mirror 5 and the light emitting portion 6 as described above, the length of one small segment 15 of the free curved surface mirror 5 in y direction becomes 0.025 mm (=10 mm/400), and the length of one segment 16 of the light emission plane in x direction becomes 1 mm (=400 mm/400). Thus, the free curved surface mirror 5 is designed in such a manner that the small segments 15 of the free curved surface mirror 5, and the segments 16 of the light emission plane have a one-to-one correspondence.

Figure 7:
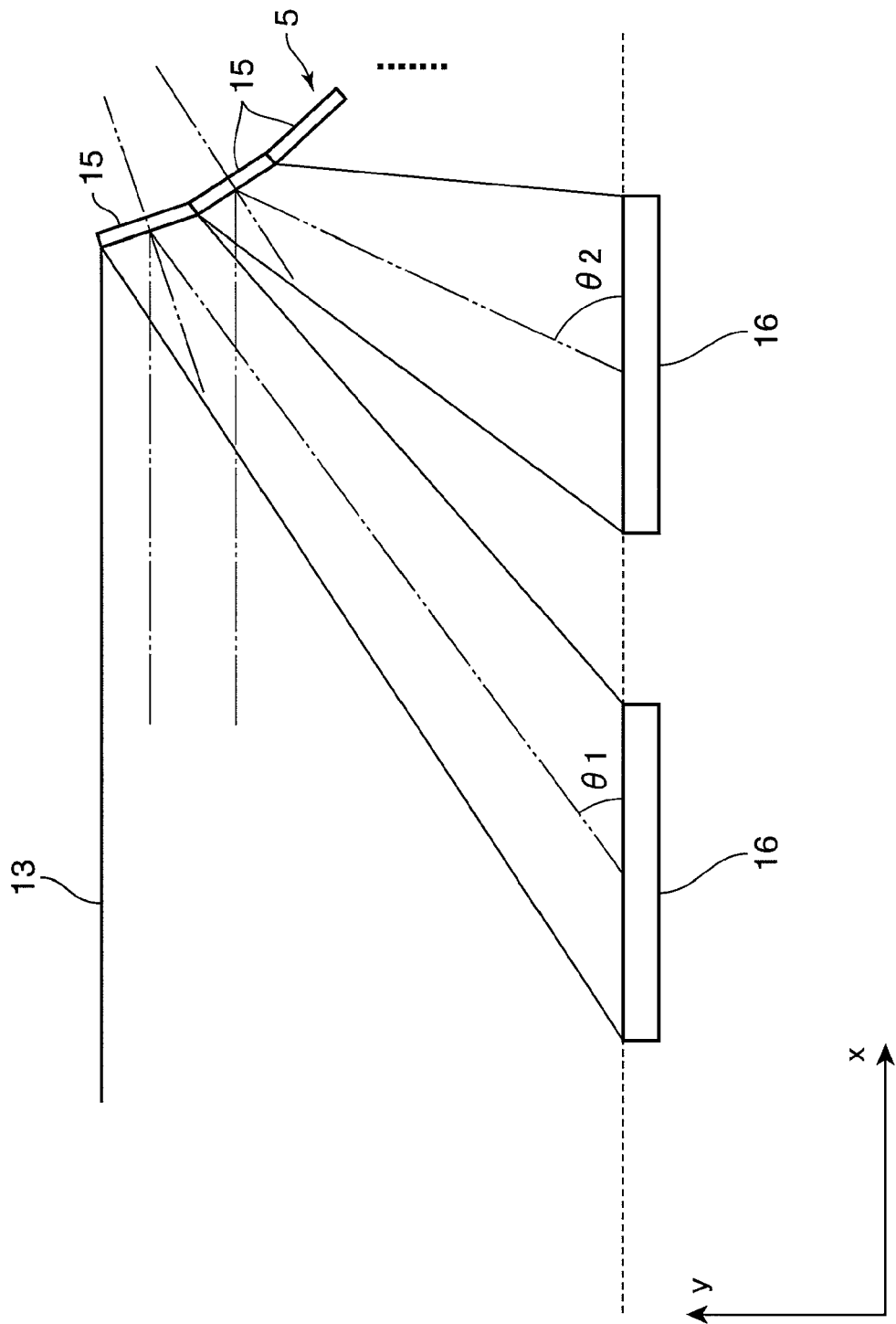
FIG. 7 is a diagram schematically showing a free curved surface mirror having multiple small segments, and a light emission plane having multiple segments.

FIG. 7 is a diagram schematically showing a free curved surface mirror having multiple small segments, and a light emission plane having multiple segments. Referring to FIG. 7, it is necessary to make the tilts of the small segments 15 different from each other to define a one-to-one relation between the small segments 15 of the free curved surface mirror 15 and the segments 16 of the light emission plane.

Figure 8:
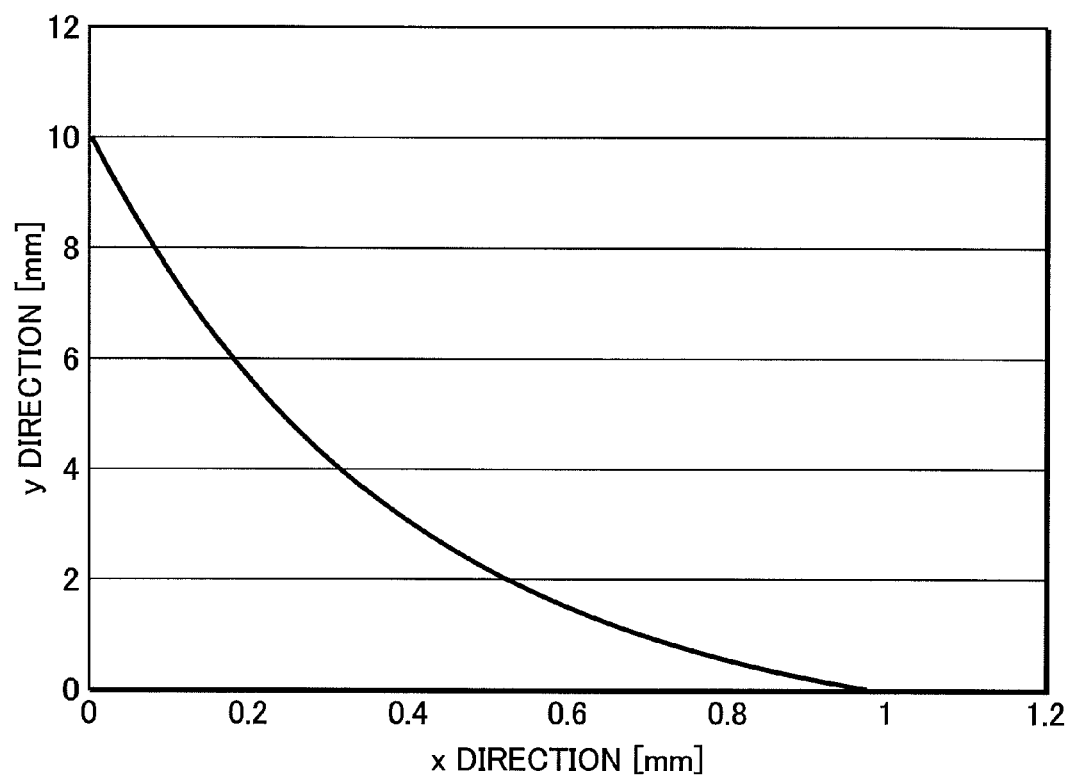
FIG. 8 is a diagram showing a curve corresponding to a sectional shape of a reflecting surface of a free curved surface mirror, which is defined as a result of computation using small segments under a certain condition.

The line beam 13 is incident onto the free curved surface mirror 5 in parallel to x direction. Incident angles θ1, θ2, . . . of beams with respect to the segments 16 are determined based on a positional relation between the small segments 15 of the free curved surface mirror 5, and the segments 16 of the light emission plane corresponding to the small segments 15. The incident angles θ1, θ2, . . . are angles to be defined respectively by the optical axes of beams reflected on the small segments 15 of the free curved surface mirror 5, and the light emission plane of the light emitting portion 6. The tilts of the small segments 15 can be geometrically calculated using the incident angles θ1, θ2, . . . . The shape of the free curved surface mirror 5 constituted of the small segments 15 can be determined by the tilts of the small segments 15. FIG. 8 is a diagram showing a curve corresponding to a sectional shape of a reflecting surface of a free curved surface mirror, which is a result of computation using the small segments under the above condition. Referring to FIG. 8, the vertical axis indicates the length of the reflecting surface in y direction, and the horizontal axis indicates the length of the reflecting surface in x direction.

In the planar illumination device 10 in accordance with the first embodiment, the lenticular lens 3 is used as a one-dimensional light diffuser. In the case where, however, laser light having a beam profile which is not subjected to a change with time is emitted from the laser light source 1, any one of an aspherical lens, a free curved surface mirror, and a diffraction optical element may be used as a one-dimensional light diffuser, as far as the one-dimensional light diffuser has a function of expanding first substantially parallel light into a linear shape.

In the modification, the laser light source 1 is particularly preferably a single mode semiconductor laser light source. Since the single mode semiconductor laser light source has a uniform beam profile, and has a Gaussian distribution, designing a one-dimensional light diffuser is easy. Also, use of the single mode semiconductor laser light source is advantageous in producing a high-fidelity planar illumination device, with less influence on the intensity distribution of planar illumination light by a temperature change and an output change of a laser light source.

In the case where a beam profile of laser light is changed with temperature or time, a beam emitted from the laser light source 1 may be incident into an optical fiber, and the beam exiting from the optical fiber may be converted into first substantially parallel light by a collimator lens for incidence onto a one-dimensional light diffuser. The beam exiting from the optical fiber has a substantially uniform beam profile without depending on the beam profile of an incident beam. Accordingly, the intensity distribution of a line beam can be made uniform without depending on the beam profile of a beam to be incident into an optical fiber. This arrangement enables to produce a high-fidelity planar illumination device with no or less change in the intensity distribution of planar illumination light. In particular, the above arrangement is useful in using a high-output semiconductor laser as a light source, because the beam profile of the high-output semiconductor laser is changed depending on a laser output or temperature.

In the case where the polarization direction of a beam to be incident into an optical fiber is aligned with the polarization direction of a beam to exit from the optical fiber, preferably, the optical fiber may be a polarization maintaining optical fiber. The polarization maintaining optical fiber has a property that polarization directions of incident light and exit light are kept unchanged.

In the case where the intensity distribution of planar illumination light is made uniform, preferably, the laser light source 1 has a single mode at least in the second direction D2. The modification is advantageous in designing the sectional shape of the free curved surface mirror 5, without the need of designing the sectional shape of the free curved surface mirror 5 depending on the property of the laser light source 1.

As described above, the collimator lens 2 converts a beam emitted from the laser light source 1 into first substantially parallel light. The lenticular lens 3 expands a beam of the first substantially parallel light into a linear shape in the first direction. The Fresnel lens 4 converts the beam expanded in the first direction into second substantially parallel light. Then, the free curved surface mirror 5 having a reflecting surface formed into a free curved surface expands a beam of the second substantially parallel light into a planar shape in the second direction orthogonal to the first direction.

In the above arrangement, the length of the beam expanded into a linear shape in the first direction is fixed in the second direction. Since the length of the beam in the second direction is unchanged, even if the length of the beam expanded into a linear shape in the first direction is sufficiently extended, the planar illumination device with a reduced thickness can be produced. Also, the beam is expanded into a planar shape while being reflected on the free curved surface mirror 5, and the beam does not transmit through an optical element. This arrangement enables to secure high light use efficiency with less light transmittance.

Since the beam expanded into a linear shape in the first direction by the lenticular lens 3 is substantially parallel to the second direction orthogonal to the first direction, the length of the beam in the second direction is unchanged, without depending on the length of the beam expanded into a linear shape in the first direction. Accordingly, the length of the beam in the second direction can be shortened, even if the length of the beam expanded into a linear shape is sufficiently extended in the first direction. Thus, the space required for generating a beam of a linear shape has a rectangular parallelepiped shape with a small thickness. This is advantageous in avoiding an increase in the size of the planar illumination device 10 in the second direction.

Since the free curved surface mirror 5 is a reflective optical element for reflecting and expanding a beam of a linear shape in the second direction, there is no constraint on the shape or the size of the free curved surface mirror 5 other than the reflecting surface. Accordingly, as compared with a light guiding plate or a like element through which light is transmitted, the free curved surface mirror 5 can be fabricated with a small volume, which is advantageous in miniaturizing the planar illumination device 10. Miniaturizing the planar illumination device 10 is useful, considering saving a space for installing the planar illumination device 10, or a like advantage. Further, since the volume of the free curved surface mirror 5 is small, the amount of a material for producing the free curved surface mirror 5 can be reduced, thereby suppressing an increase in the production cost of the planar illumination device 10.

The free curved surface mirror 5 as an optical element is inoperable to transmit light, unlike a light guiding plate. Accordingly, high light use efficiency can be secured with less light transmittance loss, and the planar illumination device 10 having high electricity-light conversion efficiency and low electric power consumption can be produced. Also, since solely the reflecting surface of the free curved surface mirror 5 is used in the planar illumination device 10, aging deterioration can be reduced, as compared with a light guiding plate or a like member.

Second Embodiment

In this section, a planar illumination device in accordance with the second embodiment of the invention is described.

Figure 9:
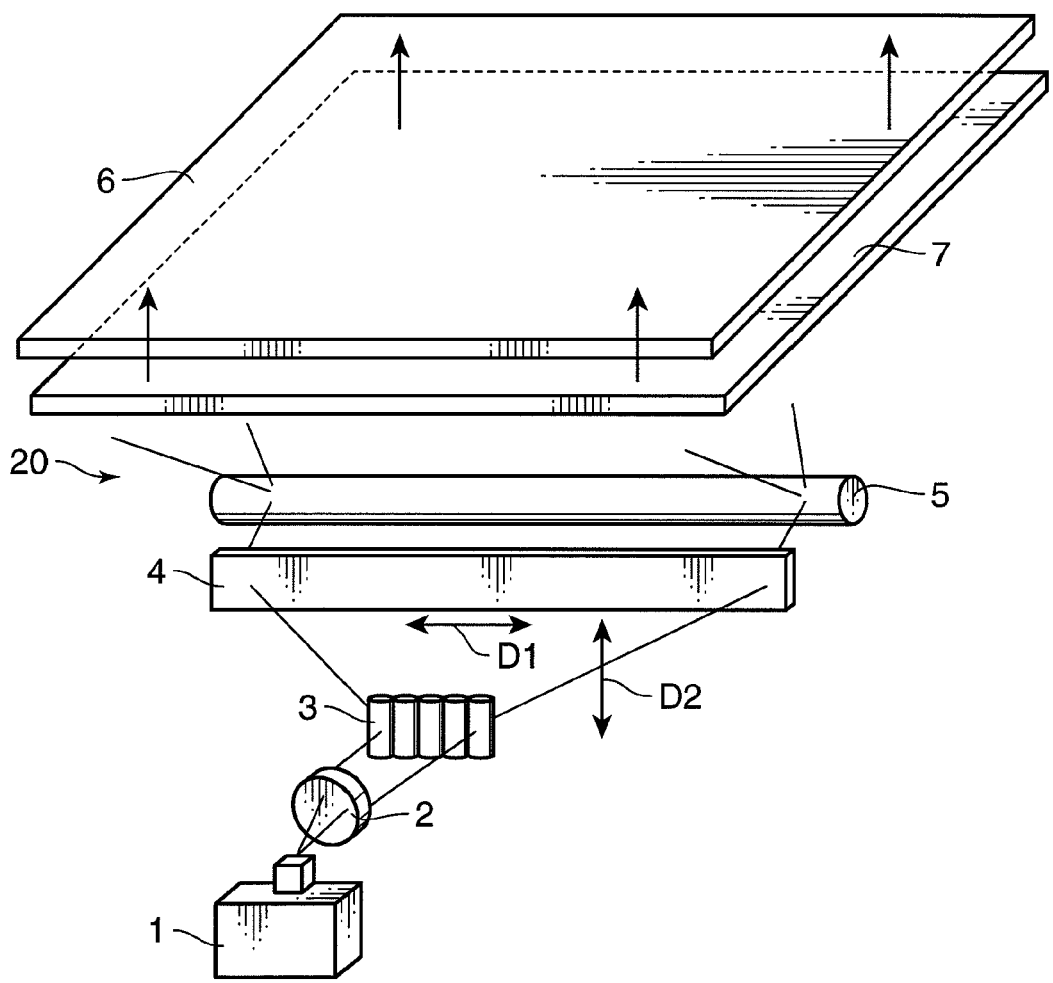
FIG. 9 is a perspective view showing a schematic arrangement of a planar illumination device in accordance with the second embodiment of the invention.
Figure 10:
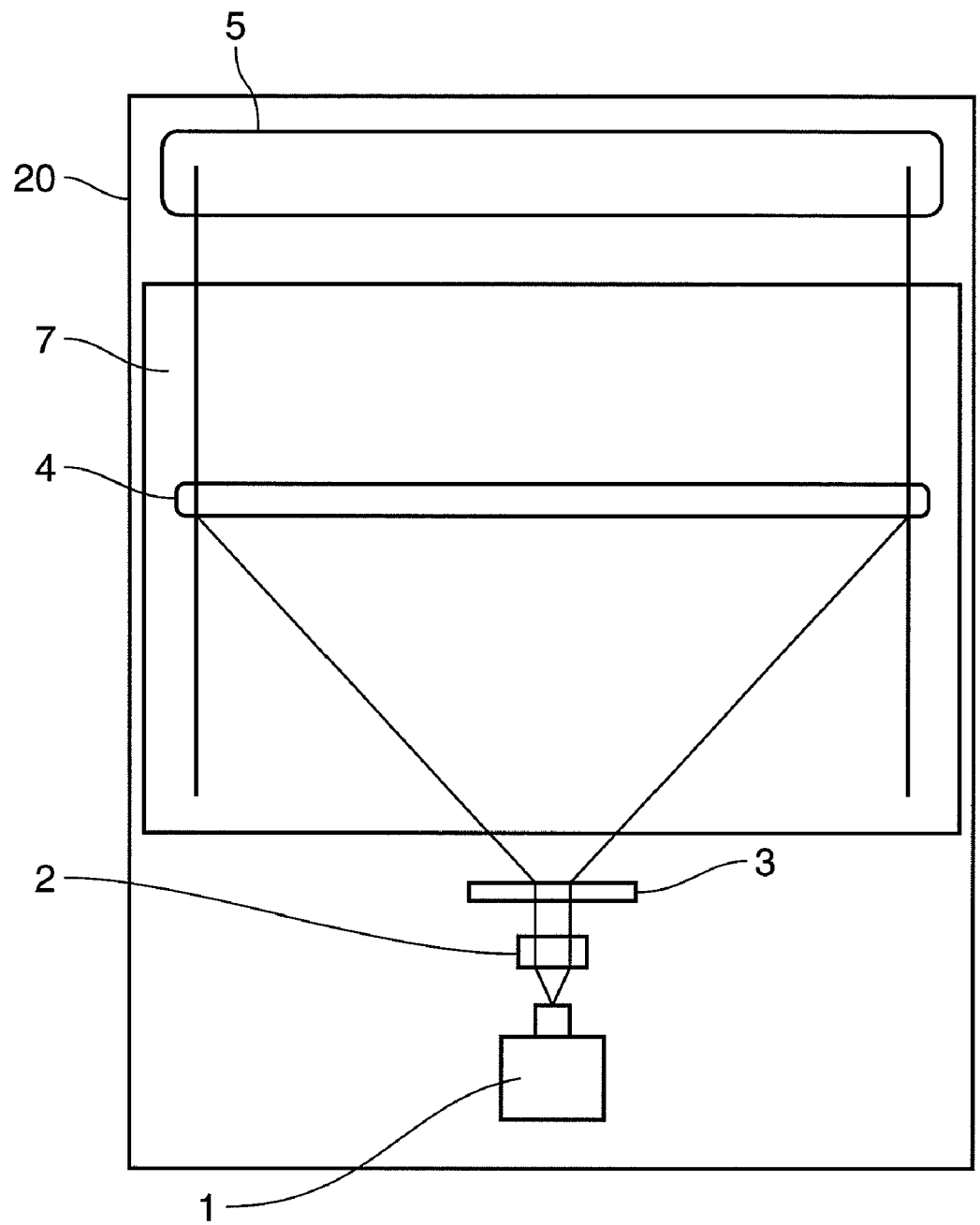
FIG. 10 is a front view showing a schematic arrangement of the planar illumination device in accordance with the second embodiment of the invention.
Figure 11:
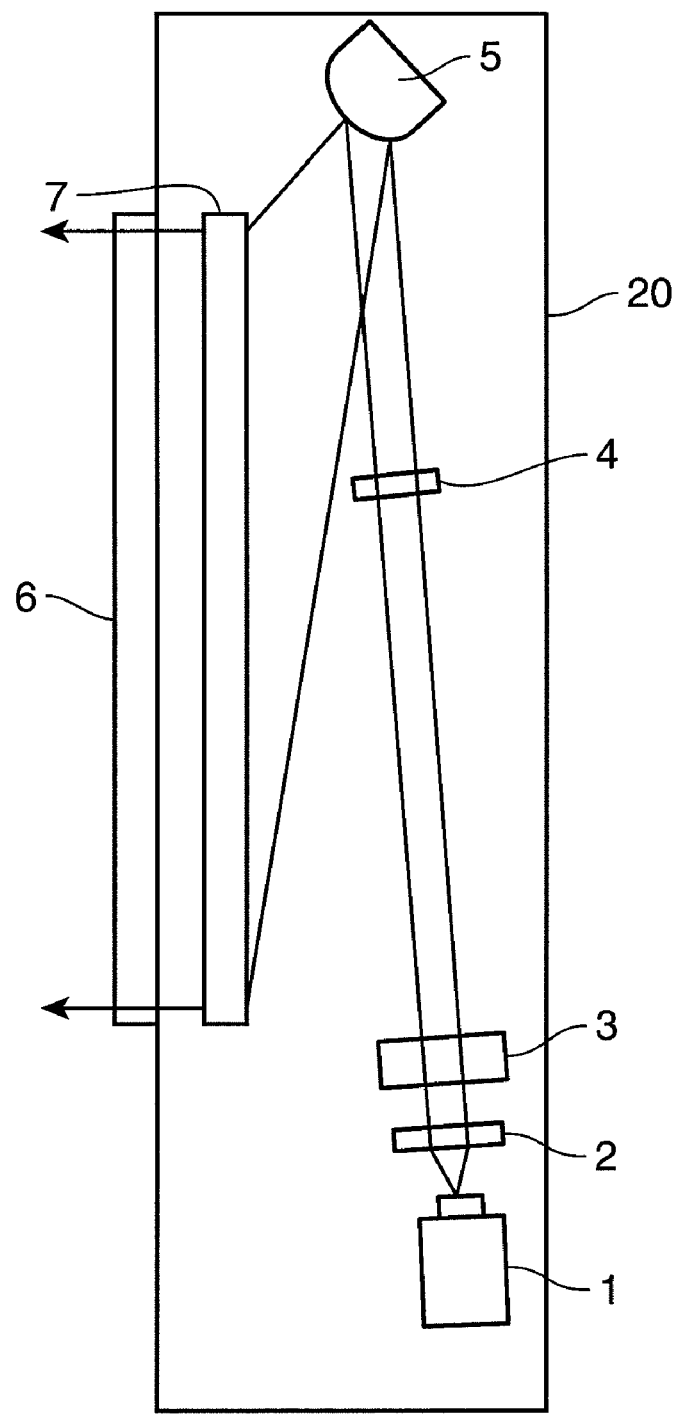
FIG. 11 is a side view showing a schematic arrangement of the planar illumination device in accordance with the second embodiment of the invention.

FIG. 9 is a perspective view showing a schematic arrangement of the planar illumination device in accordance with the second embodiment of the invention. FIG. 10 is a front view showing a schematic arrangement of the planar illumination device in accordance with the second embodiment of the invention. FIG. 11 is a side view showing a schematic arrangement of the planar illumination device in accordance with the second embodiment of the invention.

A planar illumination device 20 in accordance with the second embodiment is provided with a prism sheet 7 for converting laser light expanded by a free curved surface mirror 5 into substantially parallel light, in addition to the arrangement of the planar illumination device 10 in accordance with the first embodiment. The prism sheet 7 is a planar optical element for changing the angle of light, using light refraction or light reflection. Light reflected on the free curved surface mirror 5 is converted into third substantially parallel light by the prism sheet 7. In the second embodiment, the prism sheet 7 corresponds to an example of a planar optical element.

The planar illumination device 20 is operable to illuminate the forward direction by causing a light emitting portion 6 of the planar illumination device 20 to emit laser light expanded into a planar shape in a direction perpendicular to the light emitting portion 6. The planar illumination device 20 for illuminating the forward direction is useful as a backlight device or a like device in an LCD.

Figure 12:
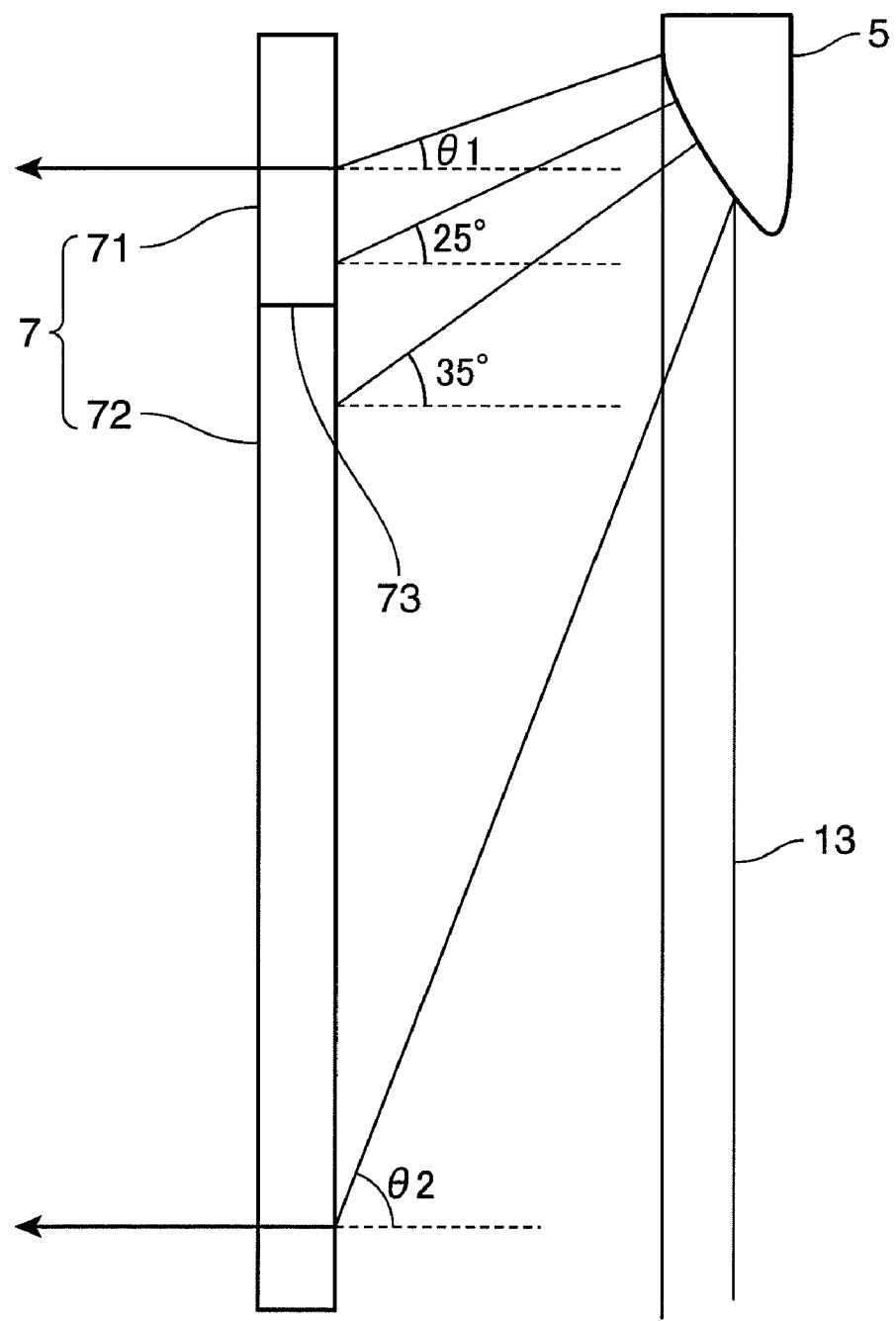
FIG. 12 is a diagram for describing a positional relation between a free curved surface mirror and a prism sheet in the planar illumination device in accordance with the second embodiment of the invention.

FIG. 12 is a diagram for describing a positional relation between the free curved surface mirror 5 and the prism sheet 7 in the planar illumination device in accordance with the second embodiment of the invention. In FIG. 12, constituent elements of the planar illumination device other than a line beam 13, the free curved surface mirror 5, and the prism sheet 7 are not illustrated.

The line beam 13 is expanded by the free curved surface mirror 5, and laser light expanded by the free curved surface mirror 5 is incident onto the prism sheet 7. In incidence, the incident angle θ1 of laser light at a light incident position corresponding to a smallest distance from the free curved surface mirror 5 to the prism sheet 7 is smaller than the incident angle θ2 of laser light at a light incident position corresponding to a longest distance from the free curved surface mirror 5 to the prism sheet 7. As is obvious from FIG. 12, an incident angle of laser light with respect to the prism sheet 7 greatly differs depending on the incident position of laser light onto the prism sheet 7.

Figure 13:
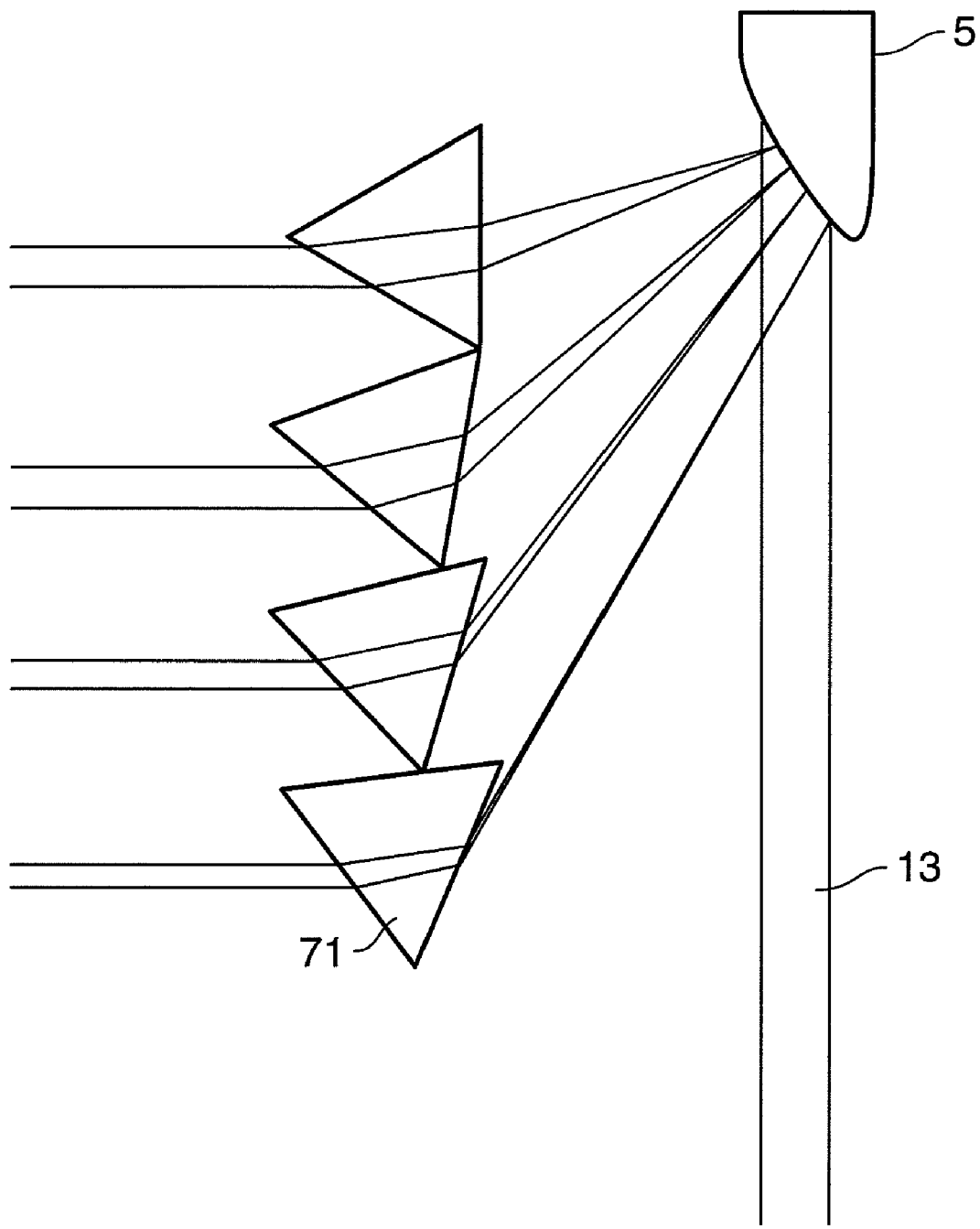
FIG. 13 is a diagram for describing a principle of a refractive prism sheet.

There are two types of the prism sheet 7 i.e. a refractive prism sheet 71 and a reflective prism sheet 72. FIG. 13 is diagram for describing a principle of the refractive prism sheet 71. The refractive prism sheet 71 is operable to emit laser light substantially in parallel by inclining prisms depending on the incident angle. As is obvious from FIG. 13, as the incident angle is increased, the incident surface of a prism and incident light are closer to a parallel position, which makes it difficult to secure a large light incident area for the prism.

Figure 14:
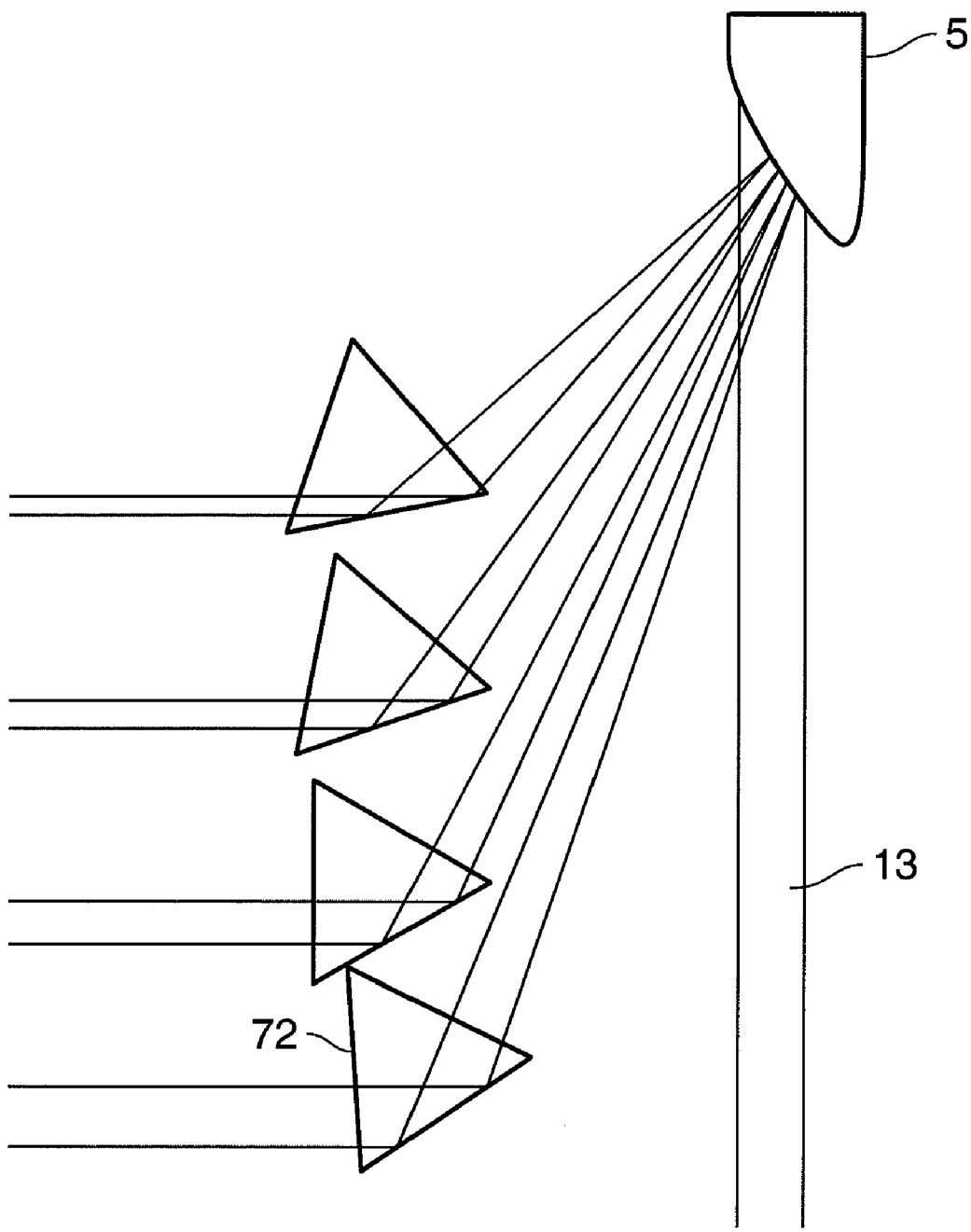
FIG. 14 is a diagram for describing a principle of a reflective prism sheet.

FIG. 14 is a diagram for describing a principle of the reflective prism sheet 72. Similarly to the refractive prism sheet 71, prisms of the reflective prism sheet 72 are inclined depending on the incident angle. Conversely to the refractive prism sheet 71, as is obvious from FIG. 14, as the incident angle is decreased, the incident surface of a prism and incident light are closer to a parallel position, which makes it difficult to secure a large light incident area for the prism.

In view of the above, in the case where the planar illumination device 20 with a reduced thickness is produced, it is preferable to arrange the free curved surface mirror 5 and the prism sheet 7 close to each other. In the case where the light use efficiency is increased, in addition to reducing the thickness of the planar illumination device, it is preferable to construct the prism sheet 7 by combining the refractive prism sheet 71 and the reflective prism sheet 72 depending on the incident angle of light, in addition to the above arrangement. Specifically, as shown in FIG. 12, the refractive prism sheet 71 and the reflective prism sheet 72 are arranged close to each other in the first direction in a state that the refractive prism sheet 71 is arranged near the free curved surface mirror 5, and the reflective prism sheet 72 is arranged away from the free curved surface mirror 5.

In particular, in the case where the free curved surface mirror 5 and the prism sheet 7 are arranged at a distance of 50 mm or smaller, as shown in FIG. 12, as far as a boundary 73 between the refractive prism sheet 71 and the reflective prism sheet 72 lies in an incident angle range from 25 degrees to 35 degrees, light use efficiency of the prism sheet 7 becomes as large as 80% or more. This enables to produce a planar illumination device with a small thickness and high light use efficiency.

As described above, disposing the reflective prism sheet 72 and the refractive prism sheet 71 at such positions that the boundary 73 between the reflective prism sheet 72 and the refractive prism sheet 71 lies in the incident angle range, from 25 degrees to 35 degrees, of a beam to be incident from the free curved surface mirror 5 onto the prism sheet 7 enables to reduce the distance between the free curved surface mirror 5 and the light emitting portion 6. This is more advantageous in producing the planar illumination device with a reduced thickness.

In the case where the prism sheet 7 is constituted of the refractive prism sheet 71 and the reflective prism sheet 72, a light diffusing sheet may be provided on the side of a light exit surface of the prism sheet 7, or a light diffusive prism sheet 7 may be used. The modification enables to reduce generation of bright line and dark line of light in the boundary 73 between the area of the reflective prism sheet 72 and the area of the refractive prism sheet 71 of the prism sheet 7. This is advantageous in obtaining uniform planar illumination light.

Since the beam expanded by the free curved surface mirror 5 is converted into the third substantially parallel light, a conventional planar illumination device can be easily replaced with, and the planar illumination device 20 with enhanced operability can be produced. Also, the planar illumination device 20 can be easily used as a backlight device in a liquid crystal display.

Further alternatively, the prism sheet 7 may be constituted of the reflective prism sheet 72, and the free curved surface mirror 5 may be disposed at an outer position with a sufficiently large distance from the prism sheet 7. In other words, the distance between the free curved surface mirror 5 and an upper end of the reflective prism sheet 72 in the optical axis direction of the laser light source 1 may be set to a sufficiently large value.

Figure 15:
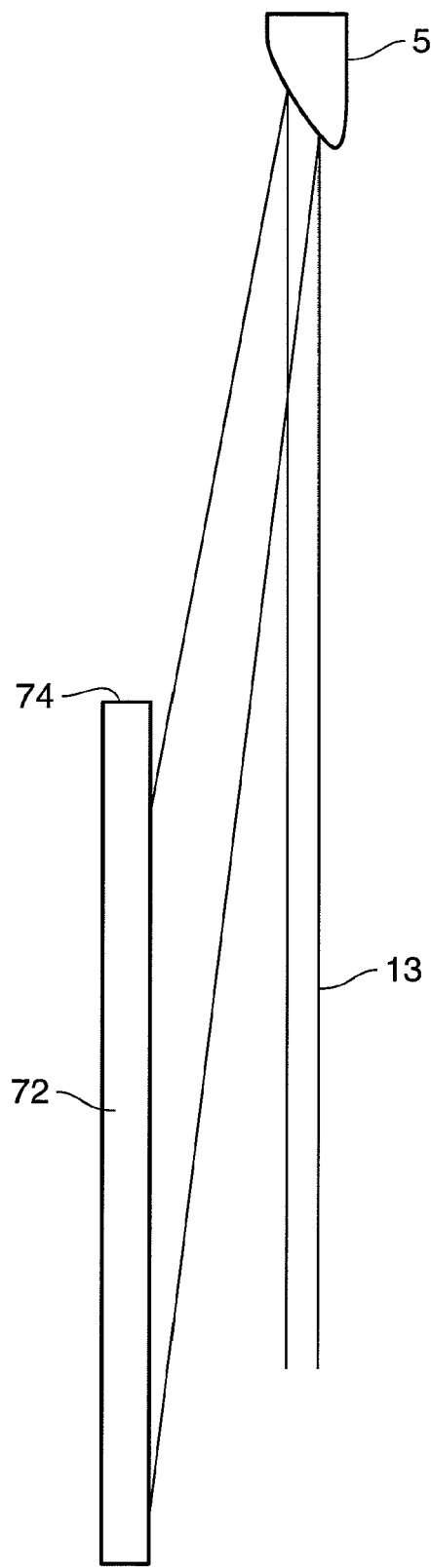
FIG. 15 is a diagram showing a positional relation between a free curved surface mirror and a prism sheet, in the case where the free curved surface mirror is disposed at an outer position with a sufficiently large distance from the prism sheet.

FIG. 15 is a diagram showing a positional relation between a free curved surface mirror and a prism sheet, in the case where the free curved surface mirror is disposed at an outer position with a sufficiently large distance from the prism sheet. As shown in FIG. 15, the free curved surface mirror 5 and the reflective prism sheet 72 are arranged at such positions that the distance between the free curved surface mirror 5 and an upper end 74 of the reflective prism sheet 72 is sufficiently large. This arrangement enables to set the incident angle of light with respect to the reflective prism sheet 72 to a sufficiently large value, without depending on the light incident position, and enhance light use efficiency of the prism sheet 7 merely with use of the reflective prism sheet 72.

Further alternatively, a hologram sheet capable of changing the angle of light by utilizing light diffraction may be used in place of the prism sheet 7. The modification enables to obtain substantially the same effect as described above in the case where the prism sheet 7 is used.

Third Embodiment

In this section, a planar illumination device in accordance with the third embodiment of the invention is described.

The planar illumination device in accordance with the third embodiment of the invention is provided with a rear mirror for reflecting a beam expanded into a planar shape by a free curved surface mirror, in addition to the arrangement of the planar illumination device in accordance with the first embodiment or the arrangement of the planar illumination device in accordance with the second embodiment.

Figure 16:
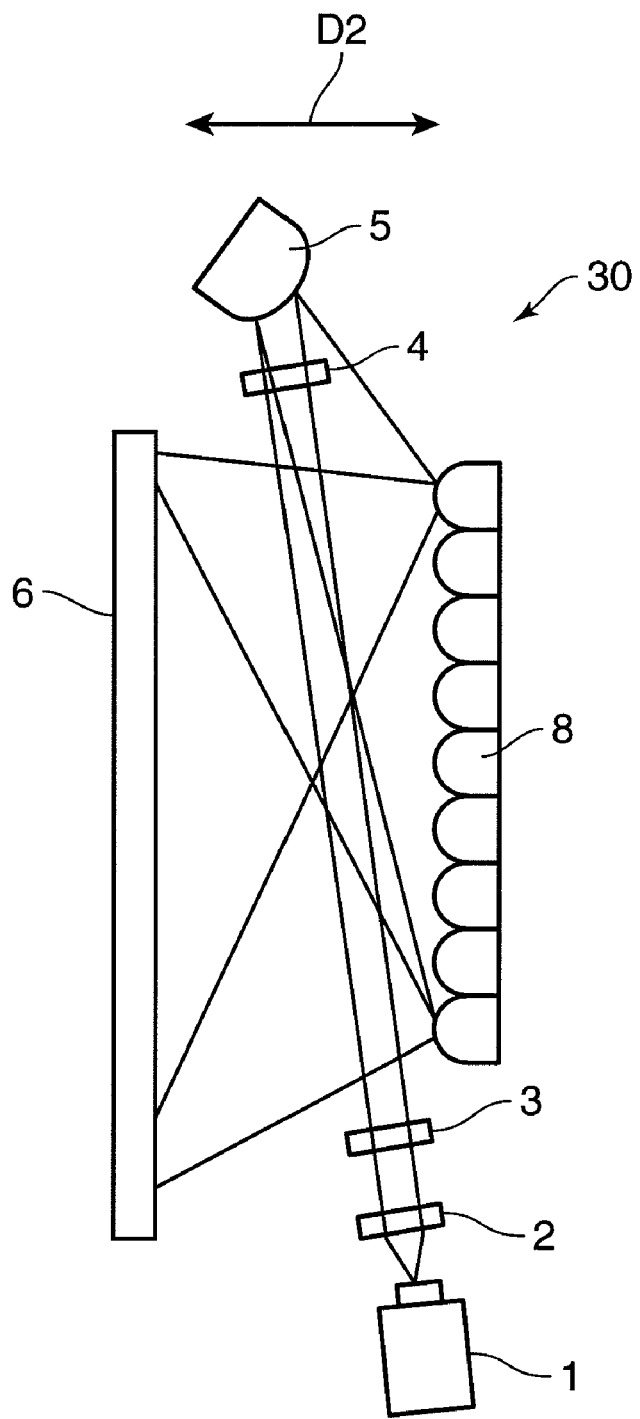
FIG. 16 is a cross-sectional view showing a schematic arrangement of a planar illumination device in accordance with the third embodiment of the invention.

FIG. 16 is a cross-sectional view showing a schematic arrangement of the planar illumination device in accordance with the third embodiment of the invention. In order to make the intensity distribution of planar illumination light uniform, preferably, the rear mirror may be a lenticular mirror having a function of expanding a beam and superimposing beams. In view of this, the planar illumination device shown in FIG. 16 is incorporated with a lenticular mirror as a rear mirror.

A planar illumination device 30 in accordance with the third embodiment includes a laser light source 1, a collimator lens 2, a lenticular lens 3, a Fresnel lens 4, a free curved surface mirror 5, a light emitting portion 6, and a lenticular mirror 8.

The lenticular mirror 8 is operable to reflect a beam reflected on the free curved surface mirror 5 toward the light emitting portion 6 for emitting a beam expanded into a planar shape to the exterior of the planar illumination device 30. The lenticular mirror 8 is also operable to divide an incident beam into multiple beams for reflection, and superimpose the multiple beams one over the other. In the third embodiment, the lenticular mirror 8 corresponds to an example of a mirror.

The lenticular mirror 8 is constituted of a small-sized reflective cylindrical lens array. Each of the reflective cylindrical lenses constituting the lenticular mirror 8 is operable to reflect a beam expanded into a planar shape by the free curved surface mirror 5. Further, since each of the reflective cylindrical lenses is operable to expand a beam incident thereon in the second direction D2, planar illumination light incident on the lenticular mirror 8 is superimposed by the lenticular mirror 8 for reflection in the second direction D2.

Since the beams reflected on the lenticular mirror 8 are superimposed in the second direction D2, the intensity distribution variation of planar illumination light reflected on the free curved surface mirror 5 can be eliminated. Thereby, a high fidelity planar illumination device with less drawbacks such as an intensity distribution variation of a line beam in the second direction D2, and damages or dusts on the surface of the free curved surface mirror 5 can be produced.

Since the lenticular mirror 8 is operable to reflect a beam reflected on the free curved surface mirror 5 toward the light emitting portion 6, the optical distance between the free curved surface mirror 5 and the light emitting portion 6 can be extended, which makes it easy to obtain planar illumination light having a large illumination area. The lenticular mirror 8 is also operable to divide an incident beam into multiple beams for reflection, and superimpose the multiple beams one over the other. Accordingly, planar illumination light having a uniform intensity distribution can be obtained without depending on an intensity distribution variation of a beam of a linear shape in the second direction D2.

Fourth Embodiment

In this section, a planar illumination device in accordance with the fourth embodiment of the invention is described.

The planar illumination device in accordance with the fourth embodiment of the invention is provided with a bending mirror, in addition to the arrangement of the planar illumination device in accordance with one of the first through the third embodiments.

Figure 17:
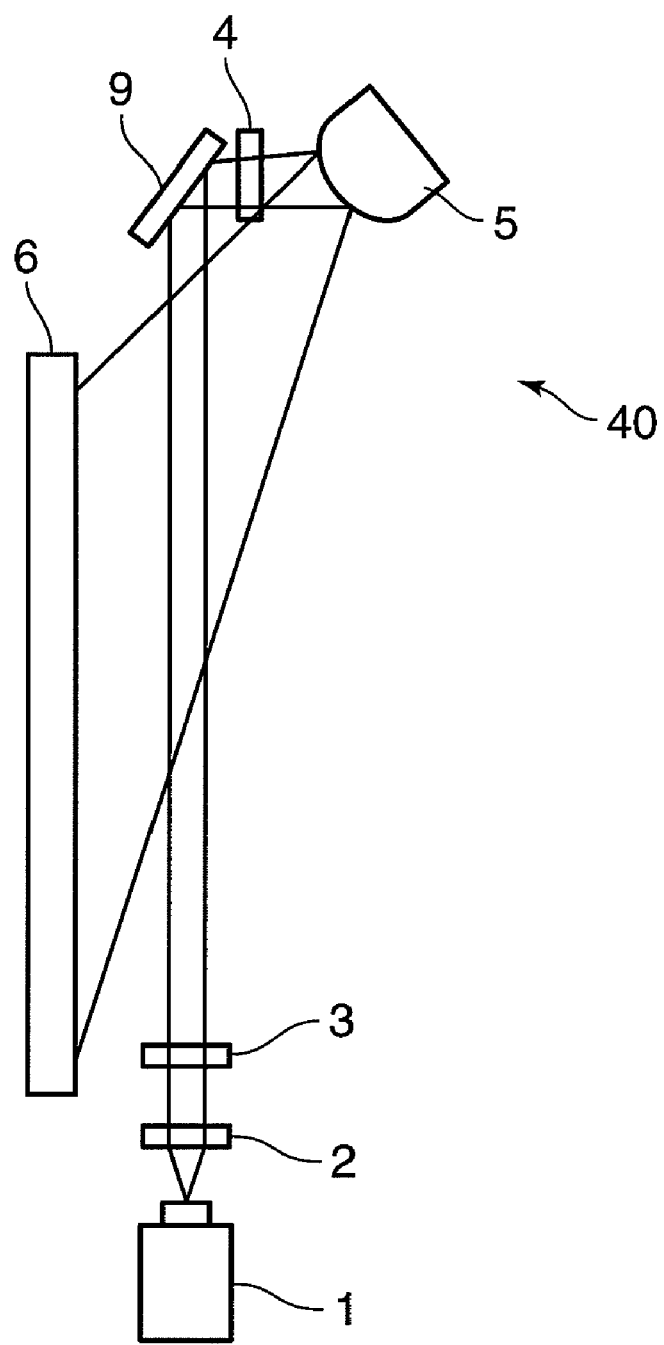
FIG. 17 is a side view showing a schematic arrangement of a planar illumination device in accordance with the fourth embodiment of the invention.

FIG. 17 is a side view showing an arrangement of the planar illumination device in accordance with the fourth embodiment of the invention. A planar illumination device 40 in accordance with the fourth embodiment includes a laser light source 1, a collimator lens 2, a lenticular lens 3, a Fresnel lens 4, a free curved surface mirror 5, a light emitting portion 6, and a bending mirror 9. The bending mirror 9 is arranged between the lenticular lens 3 and the free curved surface mirror 5, and is operable to bend a beam expanded into a linear shape by the lenticular lens 3.

Laser light emitted from the laser light source 1 is converted into first substantially parallel light by the collimator lens 2. The first substantially parallel light is then converted into a line beam by the lenticular lens 3. The line beam is reflected by the bending mirror 9 substantially at a right angle, and the bent beam is converted into second substantially parallel light by the Fresnel lens 4 for incidence onto the free curved surface mirror 5. Planar illumination light reflected on the free curved surface mirror 5 intersects with the line beam, and is emitted from the light emitting portion 6 to the exterior of the planar illumination device 40.

As is obvious from FIG. 17, bending a line beam by the bending mirror 9 enables to avoid a likelihood that the Fresnel lens 4 may obstruct light reflected on the free curved surface mirror 5 with a simplified arrangement. Since there is no likelihood that reflection light from the free curved surface mirror 5 may impinge on the Fresnel lens 4, a compact planar illumination device can be produced, with an increase in the size of the planar illumination device being suppressed.

Specifically, since a beam expanded into a linear shape by the lenticular lens 3 is bent by the bending mirror 9 for incidence onto the Fresnel lens 4, the planar illumination device with a reduced thickness can be produced, without a likelihood that the Fresnel lens 4 may obstruct a beam reflected on the free curved surface mirror 5.

Figure 18:
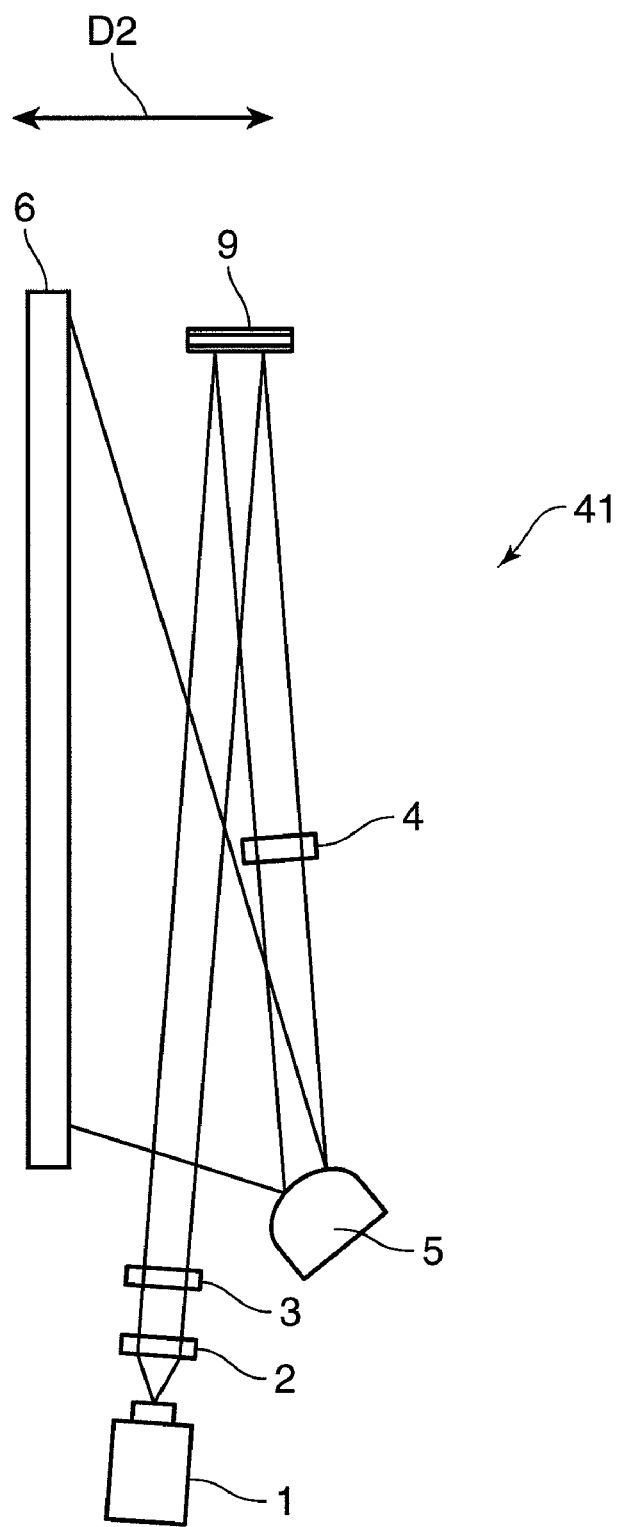
FIG. 18 is a side view showing a schematic arrangement of a planar illumination device as a modification of the fourth embodiment of the invention.

In the case where the distance from the lenticular lens 3 to the free curved surface mirror 5 is increased, the line beam may be bent so that the line beam reciprocates. FIG. 18 is a side view showing a schematic arrangement of a planar illumination device as a modification of the fourth embodiment of the invention. A planar illumination device 41 shown in FIG. 18 is operable to bend a line beam so that the line beam reciprocates.

Specifically, a bending mirror 9 is arranged near an upper end of a light emitting portion 6. A free curved surface mirror 5 is arranged near a lenticular lens 3. A Fresnel lens 4 is arranged between the bending mirror 9 and the free curved surface mirror 5. A line beam expanded by the lenticular lens 3 is bent by the bending mirror 9 toward the free curved surface mirror 5, and the bent beam is expanded into a planar shape by the free curved surface mirror 5.

Since the line beam is substantially in parallel to the second direction D2, the optical path length can be extended, with the size of the planar illumination device 41 in the second direction D2 being substantially the same as the fourth embodiment, and the length of the line beam can be extended in the first direction with a simplified arrangement. In other words, even in the case where the angle of light expanded by the lenticular lens 3 is small, the modification enables to produce the planar illumination device 41 capable of emitting planar illumination light having a large size in the first direction, with the size of the planar illumination device in the second direction D2 being substantially the same as the fourth embodiment.

In the case where a laser light source for emitting laser light of a narrow spectral bandwidth is used as the laser light source 1, and planar illumination light of enhanced quality is obtained in the planar illumination devices in accordance with the first through the fourth embodiments of the invention, preferably, the planar illumination devices may be provided with means for randomizing the phase of laser light timewise or spacewise.

For instance, laser light of 440 nm wavelength to be emitted from a blue semiconductor laser has a spectral bandwidth as small as 0.5 nm or less, and is coherent light. Accordingly, if the laser light is used as light to be emitted from a laser light source, granular speckles called speckle noise may appear on a display device. Generation of speckle noise is a phenomenon inherent to a laser for emitting laser light of a narrow spectral bandwidth, and deteriorates the quality of illumination light. Use of means for randomizing the phase of laser light timewise or spacewise enables to suppress generation of speckle noise, and obtain planar illumination light with less brightness variation.

More specifically, a vibrating device for vibrating an optical element is used as means for randomizing the phase of laser light timewise. By vibrating an optical element by a vibrating device, an interference pattern of laser light is changed timewise at a speed equal to or faster than time responsiveness of the human eye for averaging the interference pattern.

In order to suppress the electric power consumption of the vibrating device, preferably, an optical element to be vibrated may be the collimator lens 2. In the first through the fourth embodiments, the beam diameter of substantially parallel light is about 3 mm. Accordingly, the diameter of the collimator lens 2 becomes as small as about 5 mm. Since the collimator lens 2 is an optical element arranged near the laser light source 1, the interference pattern of planar illumination light can be greatly changed, even if the vibration to be applied to the collimator lens 2 is small. Thus, the energy for vibrating the collimator lens 2 can be reduced, thereby producing a low power consumption planar illumination device.

In the case where the collimator lens 2 is tilted with respect to the optical axis, the position of a line beam to be incident onto the free curved surface mirror 5 is displaced. In view of this, it is preferable to fix the angle of the collimator lens 2 with respect to the optical axis. If the angle of the collimator lens 2 with respect to the optical axis is fixed, the intensity distribution of planar illumination light can be made uniform, and generation of speckle noise can be suppressed, thereby obtaining planar illumination light of enhanced quality. An actuator to be supported by four wires is proposed as an example of a vibrating device for vibrating the collimator lens 2, with an angle of the collimator lens 2 with respect to the optical axis being fixed.

Figure 19:
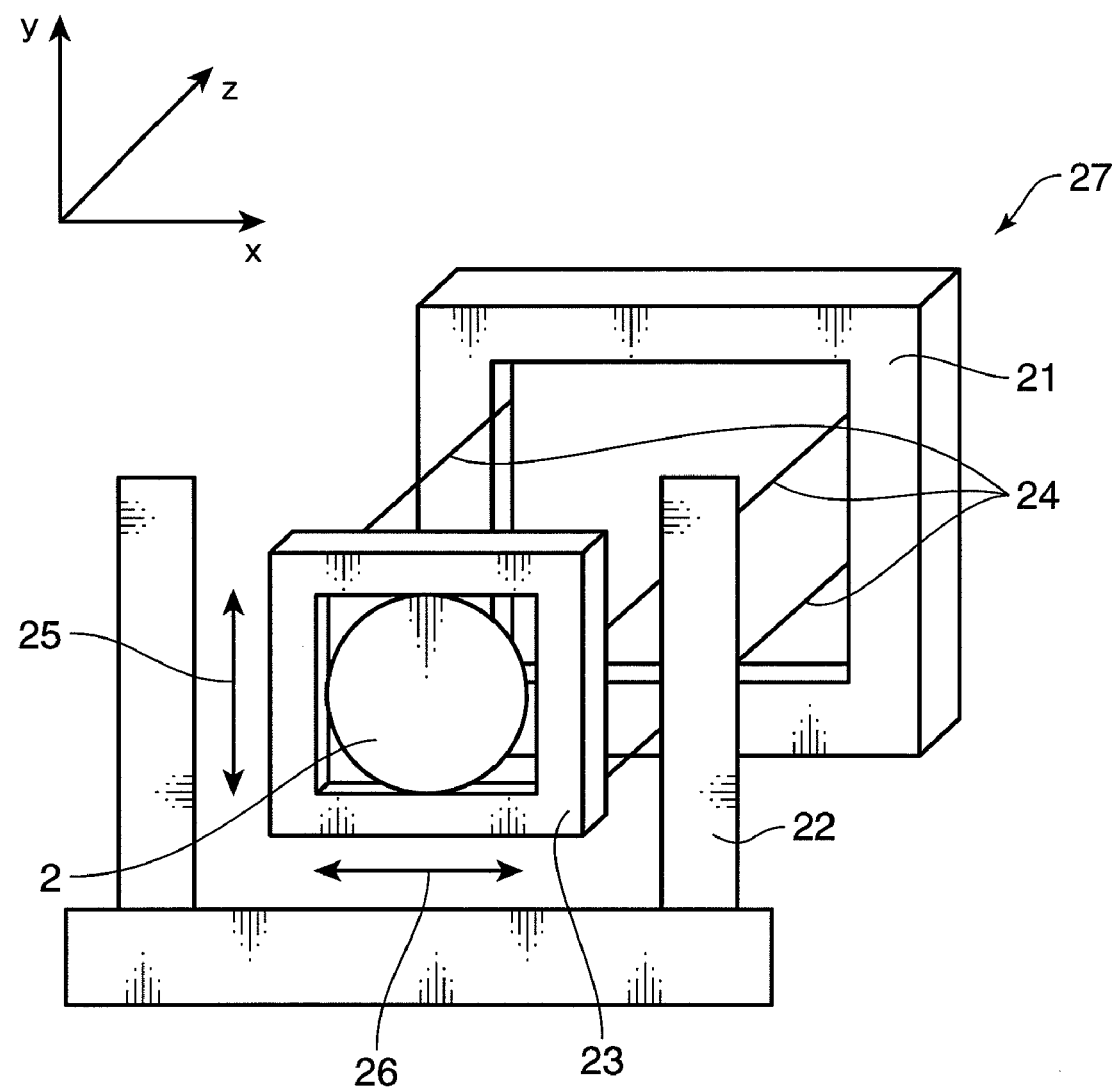
FIG. 19 is a diagram showing a schematic arrangement of an actuator for vibrating a collimator lens.

FIG. 19 is a diagram showing a schematic arrangement of an actuator for vibrating a collimator lens. FIG. 19 shows a schematic arrangement of an actuator 27 to be supported by four wires. Referring to FIG. 19, an actuator base 21 and yokes 22 are fixed to a planar illumination device, and a movable portion 23 is supported by four wires 24. A collimator lens 2 is fixed to the movable portion 23, and the movable portion 23 is subjected to a force such as a Lorenz force by the yokes 22 in a vertical direction 25 and a horizontal direction 26. The optical axis direction of the collimator lens 2 is aligned with Z axis direction in FIG. 19. The four wires 24 connect the actuator base 21 and the movable portion 23 by a parallel link structure. In this arrangement, the movable portion 23 is moved in parallel to the vertical direction 25 and the horizontal direction 26 without changing the angle of the movable portion 23 with respect to the optical axis direction. Thereby, the collimator lens 2 fixed to the movable portion 23 is allowed to vibrate without changing the angle of the movable portion 23 with respect to the optical axis direction.

Since the collimator lens 2 is vibrated as described above, generation of speckle noise can be suppressed, and planar illumination light with less brightness variation can be obtained. Also, since the collimator lens 2 is a smallest optical element among the optical elements to be used in the planar illumination device, the energy for vibration can be reduced, thereby producing a low power consumption planar illumination device.

In the case where an intensity distribution variation of planar illumination light is suppressed in the planar illumination devices in accordance with the first through the fourth embodiments, an optical element to be vibrated may be a one-dimensional light diffuser, and the expanded angle of a beam to be emitted from the one-dimensional light diffuser may be fixed. Examples of the one-dimensional light diffuser are the lenticular lens 3, and a light diffusive sheet for shaping a line beam.

Figure 20:
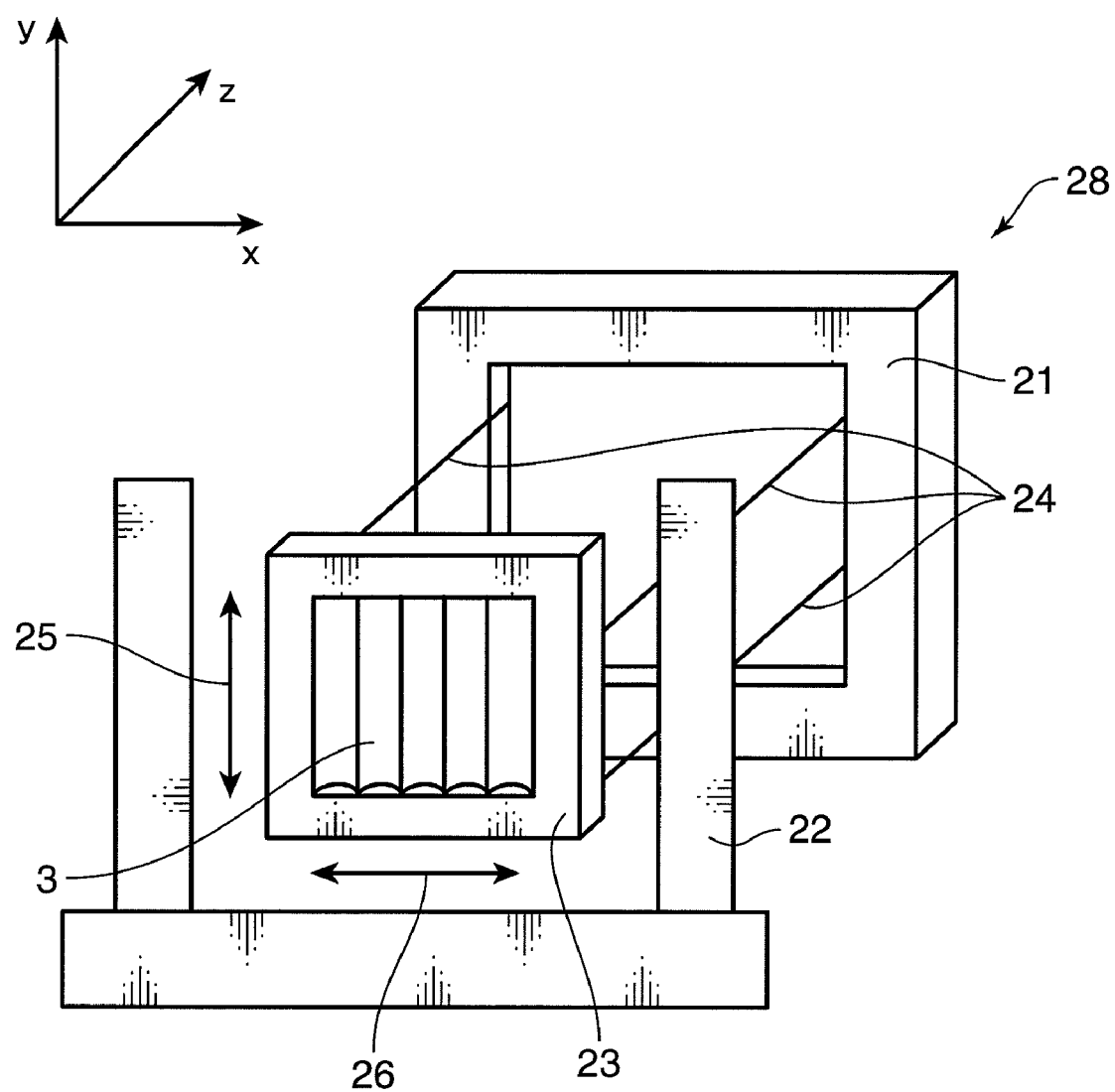
FIG. 20 is a diagram showing a schematic arrangement of an actuator for vibrating a lenticular lens.

FIG. 20 is a diagram showing a schematic arrangement of an actuator for vibrating a lenticular lens. An actuator 28 for vibrating a lenticular lens 3 has substantially the same arrangement as the actuator 27 shown in FIG. 19.

For instance, even in the case where the lenticular lens 3 is vibrated, and an area of the lenticular lens 3 on which first substantially parallel light is incident is changed, the angle of a beam expanded by the lenticular lens 3 is not changed, because the lenticular lens 3 is constituted of an array of small-sized cylindrical lenses. Further preferably, the angle of the one-dimensional light diffuser with respect to the optical axis may be fixed, and the angle of a line beam to be incident onto the free curved surface mirror 5 may be fixed. A vibrating device for vibrating the one-dimensional light diffuser may have substantially the same arrangement as the vibrating device for vibrating the collimator lens 2.

As far as the angle of the one-dimensional light diffuser with respect to the optical axis is fixed, the optical axis from the laser light source 1 for emitting laser light to the free curved surface mirror 5 for emitting planar illumination light is not changed, and the intensity distribution of planar illumination light can be made uniform. Since the intensity distribution of planar illumination light is uniform, and generation of speckle noise is suppressed, planar illumination light of enhanced quality and with no or less change in the light intensity distribution can be obtained. Further, since the one-dimensional light diffuser can be arranged at a position farther from the laser light source 1, as compared with the collimator lens 2, the vibrating device can be arranged easily.

As described above, since the lenticular lens 3 is vibrated, generation of speckle noise can be suppressed, and planar illumination light with less brightness variation can be obtained. Since the lenticular lens 3 is operable to divide a beam into multiple beams, and superimpose the multiple beams, an intensity distribution variation of planar illumination light is less likely to occur, even if the lenticular lens 3 is vibrated. Thus, a high fidelity planar illumination device can be produced.

In the case where an intensity distribution variation of planar illumination light is suppressed by positively utilizing vibration of an optical element in the planar illumination devices in accordance with the first through the fourth embodiments, the optical element to be vibrated may be the free curved surface mirror 5.

Figure 21:
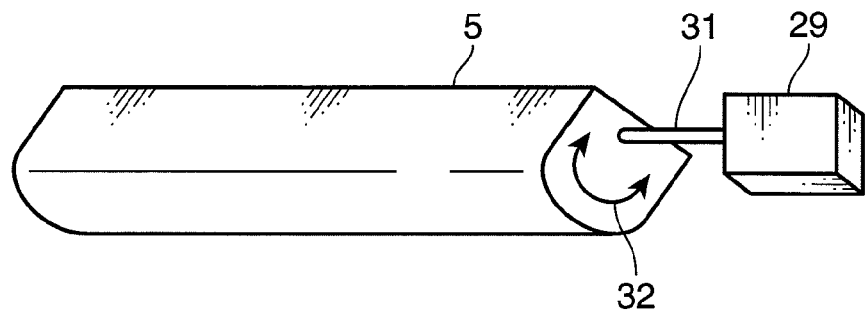
FIG. 21 is a diagram showing a schematic arrangement of an actuator for vibrating a free curved surface mirror.

FIG. 21 is a diagram showing a schematic arrangement of an actuator for vibrating a free curved surface mirror. An actuator 29 shown in FIG. 21 is connected to a rotating shaft 31 mounted on a side portion of a free curved surface mirror 5 and is operable to rotate and vibrate the rotating shaft 31. In this arrangement, the free curved surface mirror 5 is rotated and vibrated in the directions of arrows 32.

The actuator 29 is operable to apply small rotating vibrations to the free curved surface mirror 5 about an axis of the rotating shaft 31 aligned with the first direction of a line beam. Thereby, illumination light of a planar shape is scanned by a light emitting portion 6. Thereby, an interference pattern of planar illumination light is changed timewise, and generation of speckle noise is suppressed. Further, in this arrangement, since an intensity distribution variation of planar illumination light resulting from damages, dusts, or the like on the surface of the free curved surface mirror 5 can be suppressed by scanning planar illumination light by the light emitting portion 6, uniform planar illumination light can be obtained.

As described above, since the free curved surface mirror 5 is vibrated, generation of speckle noise can be suppressed, and planar illumination light with less brightness variation can be obtained. Also, the intensity distribution variation of planar illumination light can be suppressed, and planar illumination light with an uniform intensity distribution can be obtained.

In the case where a mechanical vibrating device is not used in view of preventing noise, improving device reliability, and a like merit, first substantially parallel light may be scanned, using an acoustic optical element, an electro-optic element, or a like element. Since the beam diameter of first substantially parallel light is small, it is easy to scan the first substantially parallel light. By scanning the first substantially parallel light, substantially the same effect as vibrating the collimator lens 2, or rotating and vibrating the free curved surface mirror 5 can be obtained.

In the case where a variation in polarization of planar illumination light is allowed, polarization of laser light may be changed timewise using a liquid crystal element to suppress generation of speckle noise. In the modification, the liquid crystal element is disposed on an optical path, and polarization is randomized timewise. Thereby, an interference pattern can be changed timewise, and generation of speckle noise can be suppressed.

It is needless to say that combination of two or more of the aforementioned methods may be used to suppress generation of speckle noise.

In the case where a planar illumination device has a rectangular illumination plane, and the planar illumination device is used in an upright state, concerning the planar illumination devices in accordance with the first through the fourth embodiments of the invention, preferably, the one-dimensional light diffuser may be operable to expand a beam in a transverse direction of the rectangular illumination plane, and the laser light source 1 may be disposed at a lower position in the center of the rectangular illumination plane.

Figure 22:
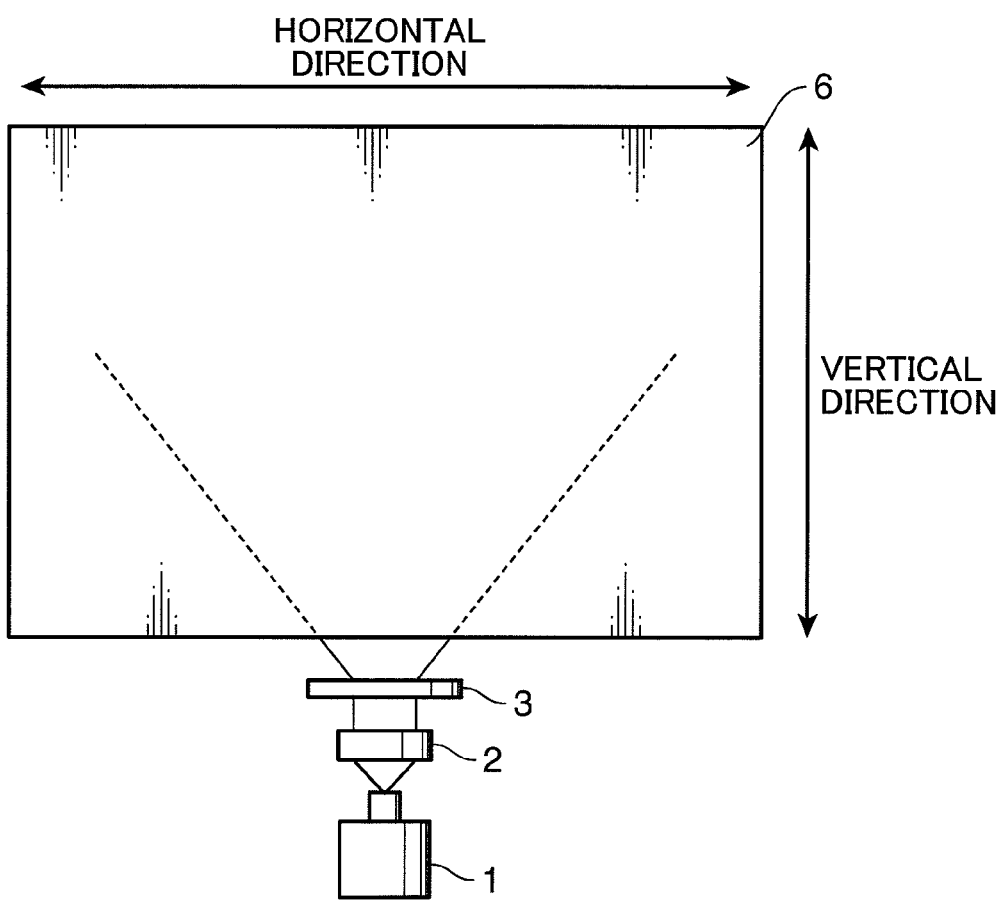
FIG. 22 is a diagram showing a state that a laser light source is arranged at a lower front position of a planar illumination device.

FIG. 22 is a diagram showing a state that a laser light source is disposed at a lower front position of a planar illumination device. As shown in FIG. 22, the laser light source 1 is disposed at a lower middle position of a light emitting portion 6. The modification enables to dispose optical elements and the like at transversely symmetrical positions with each other, and dispose the laser light source 1 at a lower front position, viewed from the front direction of the planar illumination device. In the case where the planar illumination device is used in an upright state by e.g. suspending the planar illumination device on a wall, or in the case where the planar illumination device is used as a backlight device in an image display device, a planar illumination device with superior design or a like property can be produced, because the optical elements constituting the planar illumination device are symmetrically arranged. Further, since the weight of the laser light source 1 is relatively large in the planar illumination devices in accordance with the first through the fourth embodiments, a stable planar illumination device can be produced by arranging the laser light source 1 at a lower position of the planar illumination device.

Fifth Embodiment

In this section, a planar illumination device in accordance with the fifth embodiment of the invention is described. Since the planar illumination device in accordance with the fifth embodiments incorporated with a laser as a light source, light can be modulated at a high speed. Accordingly, a color image can be formed by a color field sequential system of displaying images of different colors at a speed higher than time resolution of the human eye.

Figure 23:
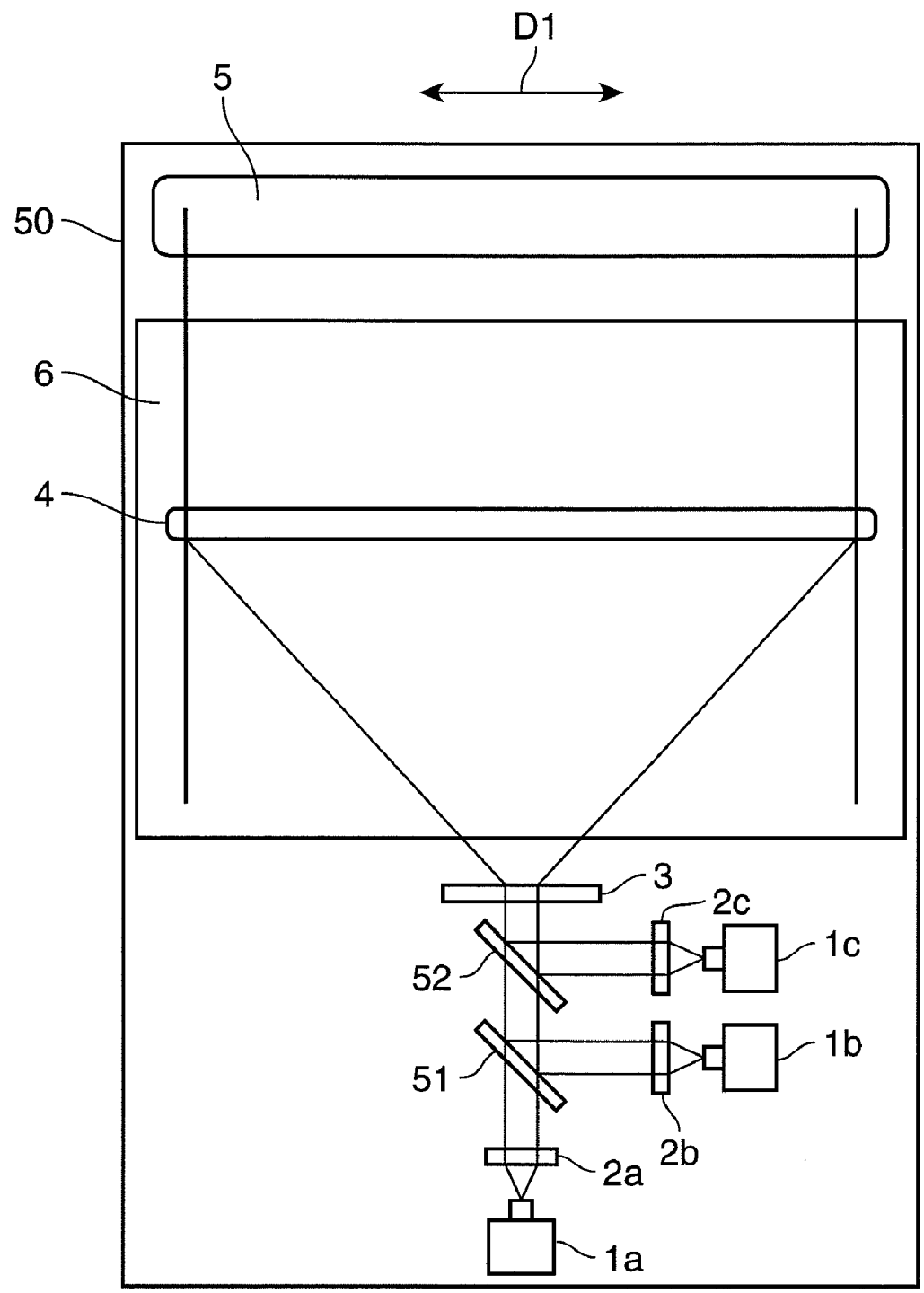
FIG. 23 is a front view showing an arrangement of a planar illumination device in accordance with the fifth embodiment of the invention.

FIG. 23 is a front view showing an arrangement of the planar illumination device in accordance with the fifth embodiment of the invention. A planar illumination device 50 in accordance with the fifth embodiment includes a blue laser light source 1a, a red laser light source 1b, a green laser light source 1c, collimator lenses 2a, 2b, and 2c, a lenticular lens 3, a Fresnel lens 4, a free curved surface mirror 5, a light emitting portion 6, and dichroic mirrors 51 and 52. Elements in the fifth embodiment identical to those of the planar illumination device 10 in accordance with the first embodiment are indicated with the same reference numerals as the first embodiment, and description thereof is omitted herein.

The blue laser light source 1a has the same arrangement as the laser light source 1, and is operable to emit blue laser light. The red laser light source 1b has the same arrangement as the laser light source 1, and is operable to emit red laser light. The green laser light source 1c has the same arrangement as the laser light source 1, and is operable to emit green laser light.

The collimator lens 2a is operable to convert the blue laser light emitted from the blue laser light source 1a into first substantially parallel light. The collimator lens 2b is operable to convert the red laser light emitted from the red laser light source 1b into first substantially parallel light. The collimator lens 2c is operable to convert the green laser light emitted from the green laser light source 1c into first substantially parallel light.

The dichroic mirror 51 is operable to transmit the blue laser light transmitted through the collimator lens 2a, and reflect the red laser light transmitted through the collimator lens 2b.

The dichroic mirror 52 is operable to transmit the blue laser light transmitted through the dichroic mirror 51, reflect the red laser light reflected on the dichroic mirror 51, and reflect the green laser light transmitted through the collimator lens 2c.

The blue laser light and the red laser light transmitted through the dichroic mirror 52, and the green laser light reflected on the dichroic mirror 52 are incident onto the lenticular lens 3. A controller (not shown) is operable to control the blue laser light source 1a, the red laser light source 1b, and the green laser light source 1c to sequentially emit the blue laser light, the red laser light, and the green laser light with a time lag by the color field sequential system.

As described above, since a blue beam, a red beam, and a green beam of three primary colors of light are emitted from the blue laser light source 1a, the red laser light source 1b, and the green laser light source 1c, respectively, a planar illumination device having a high color reproducing area can be produced.

The above arrangement also enables to eliminate use of a color filter, which is normally produce in an image display device incorporated with a liquid crystal panel. Eliminating light loss by a color filter is advantageous in enhancing light use efficiency of an image display device, and producing a low electric power consumption image display device.

Figure 24:
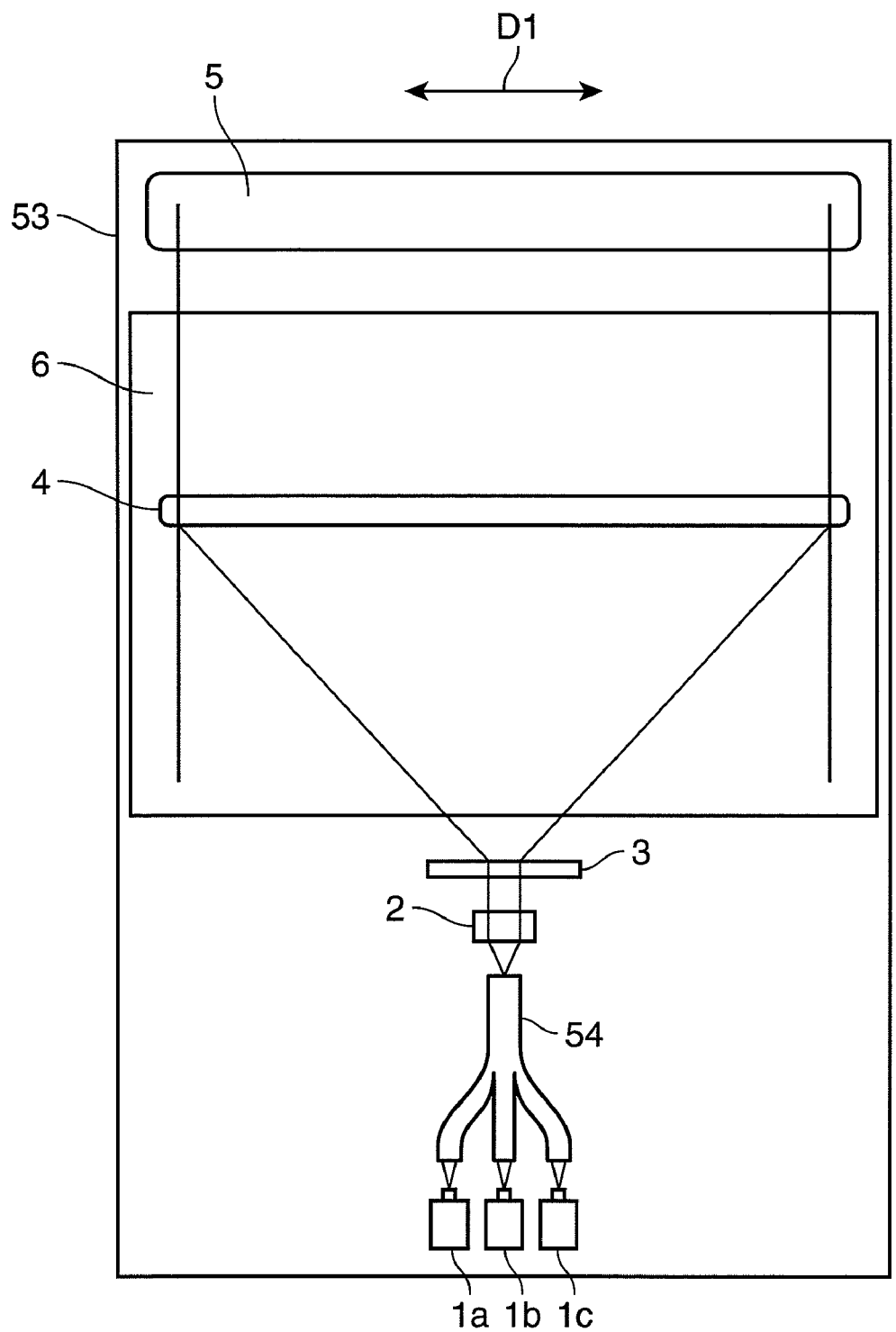
FIG. 24 is a front view showing an arrangement of a planar illumination device as a modification of the fifth embodiment of the invention.

FIG. 24 is a front view showing an arrangement of a planar illumination device as a modification of the fifth embodiment of the invention. A planar illumination device 53 as a modification of the fifth embodiment includes a blue laser light source 1a, a red laser light source 1b, a green laser light source 1c, a collimator lens 2, a lenticular lens 3, a Fresnel lens 4, a free curved surface mirror 5, a light emitting portion 6, and an optical fiber 54. Elements in the planar illumination device 50 in accordance with the fifth embodiment having the same arrangement as those in the planar illumination device 10 in accordance with the first embodiment are indicated with the same reference numerals as the first embodiment, and description thereof is omitted herein.

The optical fiber 54 is operable to combine the blue beam, the red beam, and the green beam emitted from the blue laser light source 1a, the red laser light source 1b, and the green laser light source 1c. The beam combined by the optical fiber 54 is incident onto the collimator lens 2.

As described above, combining the blue beam, the red beam, and the green beam emitted from the blue laser light source 1a, the red laser light source 1b, and the green laser light source 1c enables to produce a high fidelity planar illumination device, with less influence on the intensity distribution of planar illumination light by a change in the beam profile of the blue laser light source 1a, the red laser light source 1b, and the green laser light source 1c Sixth Embodiment In this section, an image display device in accordance with the sixth embodiment of the invention is described. The image display device in accordance with the sixth embodiment is an image display device at least including a liquid crystal panel, and one of the planar illumination devices in accordance with the first through the fifth embodiments, as a backlight device.

Figure 25:
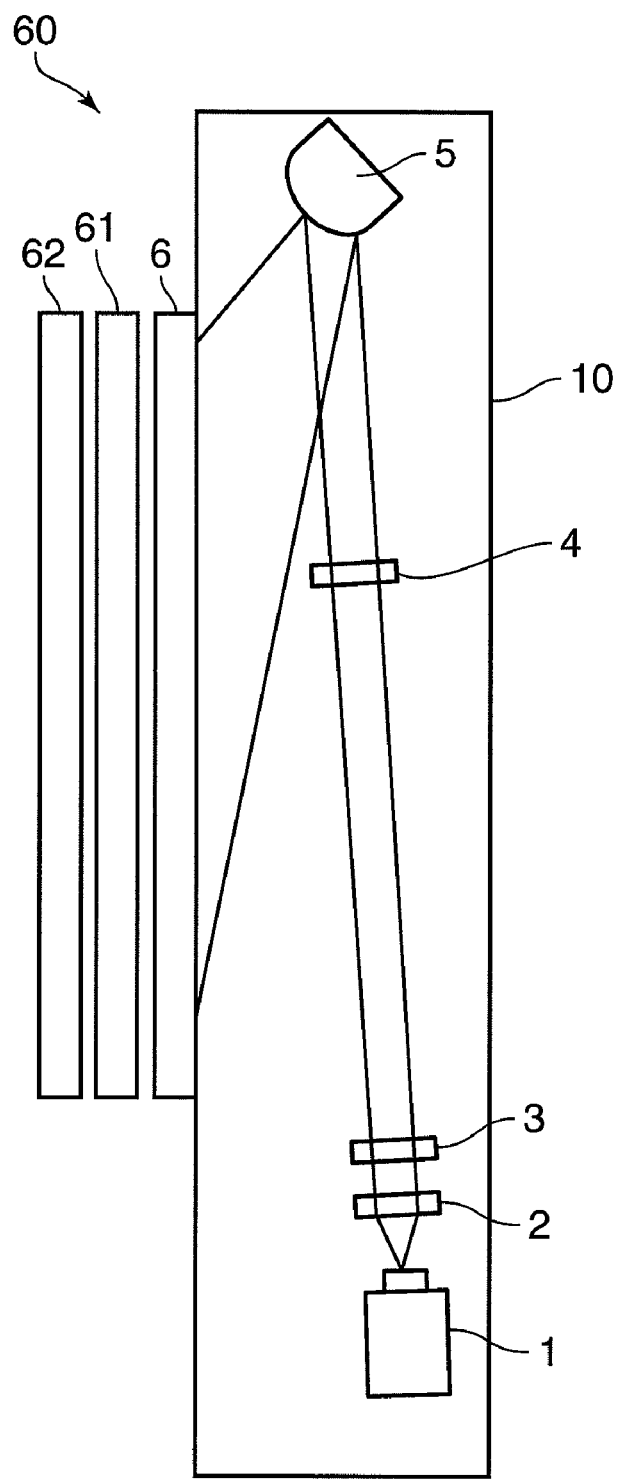
FIG. 25 is a diagram showing a schematic arrangement of an image display device in accordance with the sixth embodiment of the invention.
Figure 26:
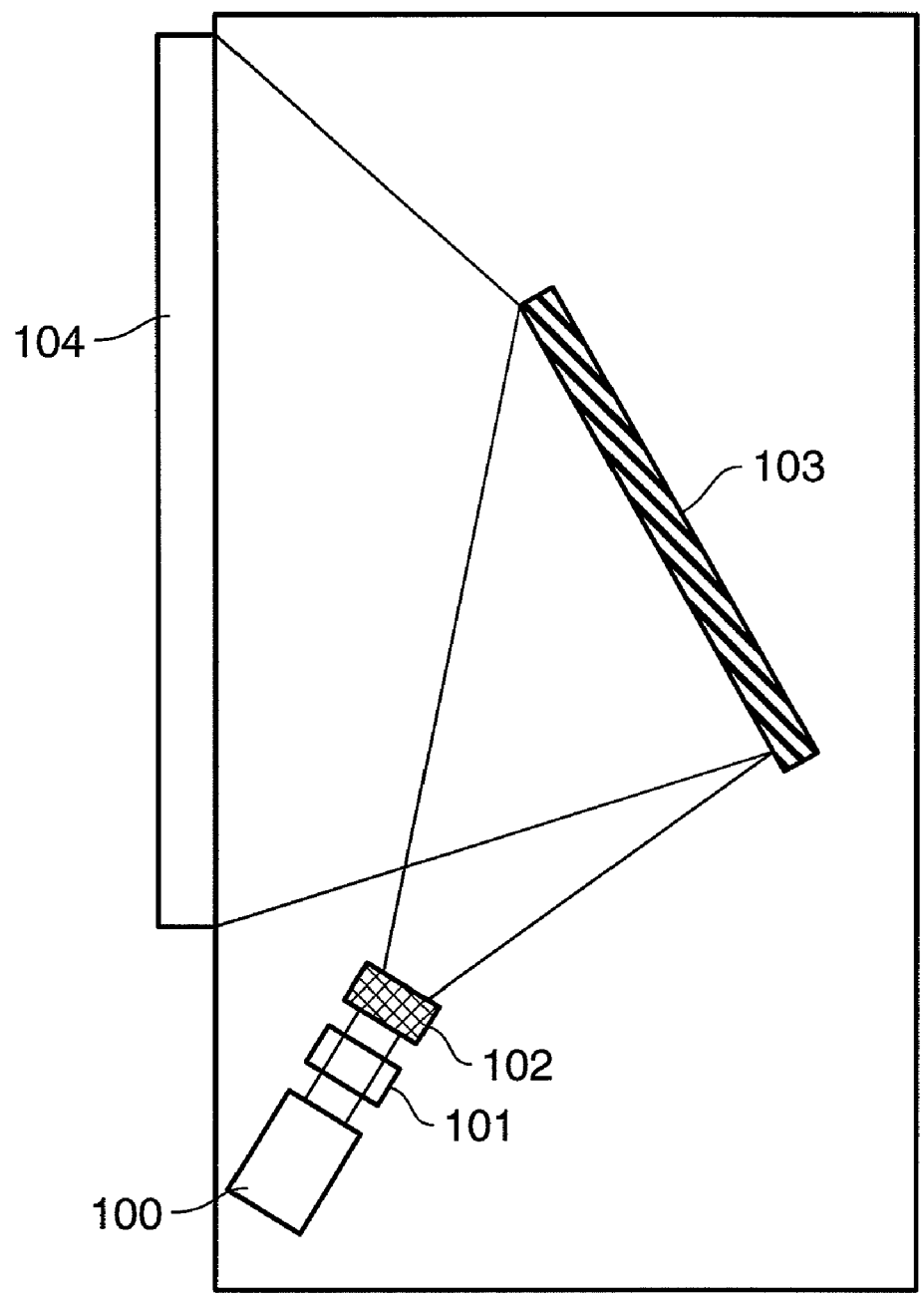
FIG. 26 is a side view showing a schematic arrangement of a general rear projection image display device.

FIG. 25 is a diagram showing a schematic arrangement of the image display device in accordance with the sixth embodiment of the invention. An image display device 60 includes a planar illumination device 10, a liquid crystal panel 61, and a fly-eye lens sheet 62. The image display device 60 shown in FIG. 25 is incorporated with the planar illumination device 10 in accordance with the first embodiment. The invention is not specifically limited to the above, but one of the planar illumination devices in accordance with the second through the fifth embodiments may be provided. Further alternatively, the image display device 60 may exclude the fly-eye lens sheet 62, and may be constituted solely of the planar illumination device 10 and the liquid crystal panel 61.

The image display device 60 incorporated with the liquid crystal panel 61 is a display device for displaying an image by controlling polarization of illumination light to be emitted from a backlight device. The image display device 60 in accordance with the sixth embodiment has a laser for emitting linearly polarized laser light, as a light source, and a planar illumination device capable of generating linearly polarized planar illumination light, as a backlight device. The image display device 60 is advantageous in enhancing light use efficiency, and suppressing electric power consumption.

The image display device 60 in accordance with the sixth embodiment is preferably provided with the fly-eye lens sheet 62 on the side of a light emission plane of the liquid crystal panel 61. More preferably, the size of each lens of the fly-eye lens sheet 62 is sufficiently smaller than the size of each pixel of the liquid crystal panel 61. An image display device incorporated with a generally available liquid crystal panel is required to have a certain view angle so that a viewer can view an image obliquely sideways or from above, as well as in front direction. In view of this, light is required to be emitted from a liquid crystal panel with a certain expanded angle. Since light to be emitted from the liquid crystal panel 61 is expanded in vertical and horizontal directions by the fly-eye lens sheet 62, a wide view angle image display device can be produced.

Arranging the fly-eye lens sheet 62 on the side of the emission plane of the liquid crystal panel 61 prevents the fly-eye lens sheet 62 from affecting light to be incident onto the liquid crystal panel 61. In this arrangement, there is no likelihood that light use efficiency of the image display device 60 may be lowered. Also, use of the fly-eye lens sheet 62 constituted of lenses, each of which has a size sufficiently smaller than the size of each pixel of the liquid crystal panel 61, is advantageous in producing the image display device 60 with less deterioration in image quality by the fly-eye lens sheet 62. In the sixth embodiment, the fly-eye lens sheet 62 corresponds to an example of a light diffuser and a lens array sheet.

Specifically, since the size of each of the lenses constituting the fly-eye lens sheet 62 is smaller than the size of a pixel of the liquid crystal panel 61, a wide view angle image display device with less image blur by the fly-eye lens sheet 62 can be produced.

In the case where the image display device 60 is incorporated with the planar illumination device 50 in accordance with the fifth embodiment, and the image display system of the image display device 60 is a color field sequential system, use of a color filter can be eliminated, and the image display device 60 with high light use efficiency and low electric power consumption can be produced.

The planar illumination devices in accordance with the first through the fifth embodiments may be used as a planar illumination device for a plant factory, in place of the image display device. Since illumination in a plant factory is used for a very long time e.g. for 24 hours, suppressing an electric power consumption in a plant factory is very important in the aspect of cost. In view of this, use of the planar illumination devices in accordance with the first through the fifth embodiments having high light use efficiency and low electric power consumption is useful.

As described above, use of a light guiding plate made of a resin as in the conventional art may deteriorate the light guiding plate by light absorption, and lower the light transmittance. However, the planar illumination devices in accordance with the first through the fifth embodiments are a direct projection optical system, and light propagates in the air. Accordingly, the planar illumination devices in accordance with the first through the fifth embodiments are advantageous in suppressing an adverse effect i.e. aging deterioration of a light guiding plate as an optical element.

It is needless to say that the planar illumination devices in accordance with the first through the fifth embodiments, and the image display device in accordance with the sixth embodiment may be modified in various ways, as far as the modifications do not depart from the gist of the invention.

The aforementioned embodiments mainly include the inventions having the following features.

A planar illumination device according to an aspect of the invention includes: a laser light source; a first converting portion for converting a beam to be emitted from the laser light source into first substantially parallel light; a one-dimensional light diffuser for expanding a beam of the first substantially parallel light converted by the first converting portion into a linear shape in a first direction; a second converting portion for converting the beam expanded in the first direction by the one-dimensional light diffuser into second substantially parallel light; and a free curved surface mirror having a reflecting surface formed into a free curved surface, and for expanding a beam of the second substantially parallel light converted by the second converting portion into a planar shape in a second direction orthogonal to the first direction.

In the above arrangement, the first converting portion converts the beam to be emitted from the laser light source into the first substantially parallel light. The one-dimensional light diffuser expands the beam of the first substantially parallel light into the linear shape in the first direction. The second converting portion converts the beam expanded in the first direction into the second substantially parallel light. Then, the free curved surface mirror having the reflecting surface formed into the free curved surface expands the beam of the second substantially parallel light into the planar shape in the second direction orthogonal to the first direction.

In the above arrangement, the length of the beam expanded into the linear shape in the first direction is fixed in the second direction. Accordingly, even if the beam of the linear shape is extended in the first direction, the length of the beam in the second direction is unchanged. This enables to produce a planar illumination device with a reduced thickness. Also, the beam is expanded into the planar shape while being reflected on the free curved surface mirror, and the beam does not transmit through an optical element. This enables to produce a planar illumination device with less light transmittance loss and high light use efficiency.

In the planar illumination device, preferably, the one-dimensional light diffuser may have a function of making intensities of the first substantially parallel light in the first direction uniform, and the free curved surface mirror may have a flat shape in section in the first direction.

In the above arrangement, since the free curved surface mirror has the flat shape in section in the first direction, the processability of the free curved surface mirror can be improved, and the processing cost of the planar illumination device can be suppressed.

In the planar illumination device, preferably, the one-dimensional light diffuser may divide the first substantially parallel light into multiple rays, expand each of the rays of the first substantially parallel light into a linear shape, and superimpose the expanded rays of the first substantially parallel light one over the other.

In the above arrangement, since the intensity distribution of the beam of the linear shape in the first direction is substantially uniform, a high fidelity planar illumination device with less influence of a beam profile difference by individual difference of laser light sources, or a change in the beam profile by a temperature change can be produced.

In the planar illumination device, preferably, the one-dimensional light diffuser may include a lenticular lens.

In the above arrangement, the polarization direction of a beam to be incident onto the lenticular lens and the polarization direction of a beam expanded into a linear shape by the lenticular lens can be aligned with each other.

Preferably, the planar illumination device may further include a planar optical element for converting the beam expanded by the free curved surface mirror into third substantially parallel light, wherein the planar optical element emits the linearly polarized third substantially parallel light onto a light emitting portion for emitting the beam of the planar shape to the exterior of the planar illumination device in a direction perpendicular to the light emitting portion.

In the above arrangement, since the beam expanded by the free curved surface mirror is converted into the third substantially parallel light, a conventional planar illumination device can be easily replaced with, and a planar illumination device with enhanced operability can be produced. Also, the planar illumination device can be easily used as a backlight device in a liquid crystal display device.

In the planar illumination device, preferably, the planar optical element may include a reflective prism sheet and a refractive prism sheet, and a boundary between the reflective prism sheet and the refractive prism sheet may lie in a range, from 25 degrees to 35 degrees, of an incident angle of a beam to be incident from the free curved surface mirror onto the planar optical element.

In the above arrangement, the reflective prism sheet and the refractive prism sheet are arranged at such positions that the boundary between the reflective prism sheet and the refractive prism sheet lies in the range, from 25 degrees to 35 degrees, of the incident angle of the beam to be incident from the free curved surface mirror onto the planar optical element. Accordingly, the distance between the free curved surface mirror and the light emitting portion can be reduced, and the planar illumination device with a further reduced thickness can be produced.

Preferably, the planar illumination device may further include a mirror for reflecting a beam reflected on the free curved surface mirror toward a light emitting portion for emitting the beam of the planar shape to the exterior of the planar illumination device.

In the above arrangement, since the mirror is operable to reflect the beam reflected on the free curved surface mirror toward the light emitting portion, the optical distance between the free curved surface mirror and the light emitting portion can be extended. This enables to obtain planar illumination light having a large illumination area.

In the planar illumination device, preferably, the mirror may divide the beam incident thereon into multiple rays for reflection, and superimpose the multiple rays one over the other.

In the above arrangement, since the mirror is operable to divide the beam incident thereon into multiple rays for reflection, and superimpose the multiple rays one over the other, planar illumination light having a uniform intensity distribution can be obtained without depending on the intensity distribution of a beam of a linear shape in the second direction.

Preferably, the planar illumination device may further include a bending mirror disposed between the one-dimensional light diffuser and the free curved surface mirror, and for bending the beam expanded into the linear shape by the one-dimensional light diffuser.

In the above arrangement, since the beam expanded into the linear shape by the one-dimensional light diffuser is bent, and the bent beam is incident onto the second converting portion, the planar illumination device with a reduced thickness can be produced, without a likelihood that the second converting portion may obstruct a beam reflected on the free curved surface mirror.

In the planar illumination device, preferably, the second converting portion may be arranged at an end of a rectangular light emitting portion for emitting the beam of the planar shape to the exterior of the planar illumination device.

In the above arrangement, since the second converting portion is arranged at the end of the rectangular light emitting portion for emitting the beam expanded into the planar shape to the exterior of the planar illumination device, the planar illumination device with a reduced thickness can be produced, without a likelihood that the second converting portion may obstruct a beam reflected on the free curved surface mirror.

Preferably, the planar illumination device may further include a vibrating device for vibrating the first converting portion, wherein the angle of the first converting portion with respect to an optical axis of the planar illumination device is fixed.

In the above arrangement, since the first converting portion is vibrated, generation of speckle noise can be reduced, and planar illumination light with less brightness variation can be obtained. Also, the first converting portion is a smallest optical element among the optical elements to be used in the planar illumination device, a planar illumination device with less energy for vibration and low electric power consumption can be produced.

Preferably, the planar illumination device may further include a vibrating device for vibrating the one-dimensional light diffuser, wherein the angle of the one-dimensional light diffuser with respect to an optical axis of the planar illumination device is fixed.

In the above arrangement, since the one-dimensional light diffuser is vibrated, generation of speckle noise can be reduced, and planar illumination light with less brightness variation can be obtained. Also, since the one-dimensional light diffuser is operable to divide a beam into multiple beams, and superimpose the multiple beams, an intensity distribution variation of planar illumination light is less likely to occur, even if the one-dimensional light diffuser is vibrated. Thus, a high fidelity planar illumination device can be produced.

Preferably, the planar illumination device may further include a vibrating device for vibrating the free curved surface mirror.

In the above arrangement, since the free curved surface mirror is vibrated, generation of speckle noise can be reduced, and planar illumination light with less brightness variation can be obtained. Also, this arrangement enables to suppress an intensity distribution variation of planar illumination light, thereby obtaining planar illumination light having a uniform intensity distribution.

In the planar illumination device, preferably, the laser light source may include a single mode semiconductor laser.

In the above arrangement, since the single mode semiconductor laser is used, a high fidelity planar illumination device with less influence on an intensity distribution of planar illumination light by a temperature change or an output change of a laser light source can be produced.

In the planar illumination device, preferably, the laser light source may emit a red beam, a green beam, and a blue beam.

In the above arrangement, since the red beam, the green beam, and the blue beam of three primary colors of light are emitted from the laser light source, a planar illumination device having a high color reproduction area can be produced.

Preferably, the planar illumination device may further include an optical fiber for combining the red beam, the green beam, and the blue beam to be emitted from the laser light source.

In the above arrangement, since the red beam, the green beam, and the blue beam to be emitted from the laser light source are combined by the optical fiber, a high fidelity planar illumination device with less influence on the intensity distribution of planar illumination light by a change in the beam profile of a laser light source can be produced.

An image display device according to another aspect of the invention at least includes the planar illumination device having the above arrangement, and a liquid crystal panel to be illuminated by the planar illumination device.

In the above arrangement, since the planar illumination device to be used as a backlight device has less light transmittance loss, as compared with a planar illumination device of a light guiding plate type, an image display device with high light use efficiency and low electric power consumption can be produced. Also, since the planar illumination device to be used as a backlight device is operable to emit linearly polarized light, light use efficiency of an image display device can be enhanced, thereby enabling to produce a low electric power consumption image display device.

Preferably, the image display device may further include a light diffuser disposed on the side of a light emission plane of the liquid crystal panel.

In the above arrangement, since the light diffuser is disposed on the side of the light emission plane of the liquid crystal panel, a wide view angle image display device can be produced. Also, this arrangement enables to produce an image display device with high light use efficiency, with no or less variation in the polarized component of illumination light to be incident onto the liquid crystal panel.

In the image display device, preferably, the light diffuser may include a lens array sheet, and each of lenses constituting the lens array sheet has a size smaller than the size of a pixel of the liquid crystal panel.

In the above arrangement, since each of the lenses constituting the lens array sheet has the size smaller than the size of the pixel of the liquid crystal panel, a wide view angle image display device with less image blur by the lens array sheet can be produced.

In the image display device, preferably, the image display device may be operated by an image display system, the image display system being a color field sequential system.

In the above arrangement, since the image display system of the image display device is the color field sequential system, use of a color filter can be eliminated, and an image display device with high light use efficiency and low electric power consumption can be produced.

INDUSTRIAL APPLICABILITY

The inventive planar illumination device and the inventive image display device are capable of securing high light use efficiency with a small thickness, and accordingly, are useful as a planar illumination device utilizing a laser as a light source, and an image display device incorporated with the planar illumination device as a backlight device.

The invention claimed is:

1. A planar illumination device, comprising:
   a laser light source;
   a first converting portion for converting a beam to be emitted from the laser light source into first substantially parallel light;
   a one-dimensional light diffuser for expanding a beam of the first substantially parallel light converted by the first converting portion into a linear shape in a first direction;
   a second converting portion for converting the beam expanded in the first direction by the one-dimensional light diffuser into second substantially parallel light; and
   a free curved surface mirror having a reflecting surface formed into a free curved surface, and for expanding a beam of the second substantially parallel light converted by the second converting portion into a planar shape in a second direction orthogonal to the first direction.

2. The planar illumination device according to claim 1, wherein the one-dimensional light diffuser has a function of making intensities of the first substantially parallel light in the first direction uniform, and
   wherein the free curved surface mirror has a flat shape section in the first direction.

3. The planar illumination device according to claim 2, wherein the one-dimensional light diffuser divides the first substantially parallel light into multiple rays, expands each ray of the multiple rays of the first substantially parallel light into a linear shape, and superimposes the expanded rays of the first substantially parallel light one over another.

4. The planar illumination device according to claim 3, wherein the one-dimensional light diffuser includes a lenticular lens.

5. The planar illumination device according to claim 1, wherein the planar illumination device further comprises a planar optical element for converting the beam expanded by the free curved surface mirror into third substantially parallel light, and
   wherein the planar optical element emits a linearly polarized third substantially parallel light onto a light emitting portion for emitting the beam of the planar shape to an exterior of the planar illumination device in a direction perpendicular to the light emitting portion.

6. The planar illumination device according to claim 5, wherein the planar optical element includes a reflective prism sheet and a refractive prism sheet, and
   wherein a boundary between the reflective prism sheet and the refractive prism sheet lies in a range, from 25 degrees to 35 degrees, of an incident angle of a beam to be incident from the free curved surface mirror onto the planar optical element.

7. The planar illumination device according to claim 1, further comprising a mirror for reflecting a beam reflected on the free curved surface mirror toward a light emitting portion for emitting the beam of the planar shape to an exterior of the planar illumination device.

8. The planar illumination device according to claim 7, wherein the mirror divides the beam incident thereon into multiple rays for reflection, and superimposes the multiple rays one over another.

9. The planar illumination device according to claim 1, further comprising a bending mirror disposed between the one-dimensional light diffuser and the free curved surface mirror, and for bending the beam expanded into the linear shape by the one-dimensional light diffuser.

10. The planar illumination device according to claim 1, wherein the second converting portion is arranged at an end of a rectangular light emitting portion for emitting the beam of the planar shape to an exterior of the planar illumination device.

11. The planar illumination device according to claim 1, wherein the planar illumination device further comprises a vibrating device for vibrating the first converting portion, and
    wherein an angle of the first converting portion with respect to an optical axis is fixed.

12. The planar illumination device according to claim 1, wherein the planar illumination device further comprises a vibrating device for vibrating the one-dimensional light diffuser, and
    wherein an angle of the one-dimensional light diffuser with respect to an optical axis is fixed.

13. The planar illumination device according to claim 1, further comprising a vibrating device for vibrating the free curved surface mirror.

14. The planar illumination device according to claim 1, wherein the laser light source includes a single mode semiconductor laser.

15. The planar illumination device according to claim 1, wherein the laser light source emits a red beam, a green beam, and a blue beam.

16. The planar illumination device according to claim 15, further comprising an optical fiber for combining the red beam, the green beam, and the blue beam to be emitted from the laser light source.

17. An image display device, at least comprising:
    the planar illumination device of claim 1; and
    a liquid crystal panel to be illuminated by the planar illumination device.

18. The image display device according to claim 17, further comprising a light diffuser disposed on a side of a light emission plane of the liquid crystal panel.

19. The image display device according to claim 18, wherein the light diffuser includes a lens array sheet, and
    wherein each of lenses constituting the lens array sheet has a size smaller than a size of a pixel of the liquid crystal panel.

20. The image display device according to claim 17, wherein the image display device is operated by an image display system, the image display system being a color field sequential system.

* * * * *

UNITED STATES PATENT AND TRADEMARK OFFICE
CERTIFICATE OF CORRECTION

| | | |
|---|---|---|
| PATENT NO. | : 8,154,685 B2 | Page 1 of 1 |
| APPLICATION NO. | : 12/519947 | |
| DATED | : April 10, 2012 | |
| INVENTOR(S) | : Kenji Nakayama et al. | |

It is certified that error appears in the above-identified patent and that said Letters Patent is hereby corrected as shown below:

IN THE CLAIMS

In column 26, line 41 (claim 17, line 1), "An image display device, at least comprising:" should read --An image display device, comprising:--.

Signed and Sealed this
Twenty-eighth Day of August, 2012

David J. Kappos
*Director of the United States Patent and Trademark Office*